US012361652B2

(12) United States Patent
Egri et al.

(10) Patent No.: US 12,361,652 B2
(45) Date of Patent: *Jul. 15, 2025

(54) AUGMENTED REALITY OBJECT MANIPULATION

(71) Applicant: Snap Inc., Santa Monica, CA (US)

(72) Inventors: Ozi Egri, Yassur (IL); David Ben Ezra, Bet Shearim (IL); Andrew James McPhee, Culver City, CA (US); Qi Pan, London (GB); Eyal Zak, Megiddo (IL)

(73) Assignee: Snap Inc., Santa Monica, CA (US)

(*) Notice: Subject to any disclaimer, the term of this patent is extended or adjusted under 35 U.S.C. 154(b) by 8 days.

This patent is subject to a terminal disclaimer.

(21) Appl. No.: 18/150,041

(22) Filed: Jan. 4, 2023

(65) Prior Publication Data

US 2023/0142438 A1 May 11, 2023

Related U.S. Application Data

(63) Continuation of application No. 16/790,322, filed on Feb. 13, 2020, now Pat. No. 11,580,700, which is a continuation of application No. 15/581,994, filed on Apr. 28, 2017, now Pat. No. 10,593,116.

(60) Provisional application No. 62/449,451, filed on Jan. 23, 2017, provisional application No. 62/444,218, filed on Jan. 9, 2017, provisional application No. 62/412,103, filed on Oct. 24, 2016.

(51) Int. Cl.
*G06T 19/00* (2011.01)
*G06F 3/04815* (2022.01)
*G06T 19/20* (2011.01)

(52) U.S. Cl.
CPC ........ *G06T 19/006* (2013.01); *G06F 3/04815* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| 5,751,850 A | 5/1998 | Rindtorff |
| 5,880,731 A | 3/1999 | Liles et al. |

(Continued)

FOREIGN PATENT DOCUMENTS

| CA | 2887596 A1 | 7/2015 |
| CN | 102609954 A | 7/2012 |

(Continued)

OTHER PUBLICATIONS

US 10,964,114 B2, 03/2021, Hare et al. (withdrawn)

(Continued)

*Primary Examiner* — Nicholas R Wilson
(74) *Attorney, Agent, or Firm* — Schwegman Lundberg & Woessner, P.A.

(57) ABSTRACT

Among other things, embodiments of the present disclosure improve the functionality of computer imaging software and systems by facilitating the manipulation of virtual content displayed in conjunction with images of real-world objects and environments. Embodiments of the present disclosure allow different virtual objects to be moved onto different physical surfaces, as well as manipulated in other ways.

18 Claims, 12 Drawing Sheets

(56) References Cited

U.S. PATENT DOCUMENTS

| | | | |
|---|---|---|---|
| 6,020,891 A | 2/2000 | Rekimoto | |
| 6,023,270 A | 2/2000 | Brush et al. | |
| 6,038,295 A | 3/2000 | Mattes | |
| 6,157,342 A | 12/2000 | Okude et al. | |
| 6,223,165 B1 | 4/2001 | Lauffer | |
| 6,434,277 B1 | 8/2002 | Yamada et al. | |
| 6,597,730 B1 | 7/2003 | Bader | |
| 6,772,195 B1 | 8/2004 | Hatlelid et al. | |
| 6,842,779 B1 | 1/2005 | Nishizawa | |
| 6,867,787 B1 | 3/2005 | Shimizu et al. | |
| 6,980,909 B2 | 12/2005 | Root et al. | |
| 7,173,651 B1 | 2/2007 | Knowles | |
| 7,342,587 B2 | 3/2008 | Danzig et al. | |
| 7,411,493 B2 | 8/2008 | Smith | |
| 7,468,729 B1 | 12/2008 | Levinson | |
| 7,535,890 B2 | 5/2009 | Rojas | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,131,597 B2 | 3/2012 | Hudetz | |
| 8,146,005 B2 | 3/2012 | Jones et al. | |
| 8,151,191 B2 | 4/2012 | Nicol | |
| 8,199,747 B2 | 6/2012 | Rojas et al. | |
| 8,332,475 B2 | 12/2012 | Rosen et al. | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,553,032 B1 | 10/2013 | Poston | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,570,343 B2 | 10/2013 | Halstead | |
| 8,581,911 B2 | 11/2013 | Becker et al. | |
| 8,597,121 B2 | 12/2013 | Andres del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,718,333 B2 | 5/2014 | Wolf et al. | |
| 8,724,622 B2 | 5/2014 | Rojas | |
| 8,730,156 B2 | 5/2014 | Weising et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,874,677 B2 | 10/2014 | Rosen et al. | |
| 8,890,926 B2 | 11/2014 | Tandon et al. | |
| 8,892,999 B2 | 11/2014 | Nims et al. | |
| 8,909,679 B2 | 12/2014 | Root et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 8,995,433 B2 | 3/2015 | Rojas | |
| 9,031,809 B1 | 5/2015 | Kumar et al. | |
| 9,040,574 B2 | 5/2015 | Wang et al. | |
| 9,055,416 B2 | 6/2015 | Rosen et al. | |
| 9,086,776 B2 | 7/2015 | Ye et al. | |
| 9,100,806 B2 | 8/2015 | Rosen et al. | |
| 9,100,807 B2 | 8/2015 | Rosen et al. | |
| 9,105,014 B2 | 8/2015 | Collet et al. | |
| 9,191,776 B2 | 11/2015 | Root et al. | |
| 9,204,252 B2 | 12/2015 | Root | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,430,791 B1 | 8/2016 | Sutton-Shearer | |
| 9,442,564 B1 | 9/2016 | Dillon | |
| 9,443,227 B2 | 9/2016 | Evans et al. | |
| 9,460,541 B2 | 10/2016 | Li et al. | |
| 9,489,661 B2 | 11/2016 | Evans et al. | |
| 9,489,760 B2 | 11/2016 | Li et al. | |
| 9,491,134 B2 | 11/2016 | Rosen et al. | |
| 9,503,845 B2 | 11/2016 | Vincent | |
| 9,508,197 B2 | 11/2016 | Quinn et al. | |
| 9,517,403 B1 | 12/2016 | Kim et al. | |
| 9,544,257 B2 | 1/2017 | Ogundokun et al. | |
| 9,576,201 B2 | 2/2017 | Wu et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,633,447 B2 | 4/2017 | Swaminathan et al. | |
| 9,645,394 B2 | 5/2017 | Kinnebrew et al. | |
| 9,648,376 B2 | 5/2017 | Chang et al. | |
| 9,652,897 B2 | 5/2017 | Osborn et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,789,403 B1 | 10/2017 | Furment et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,173,141 B1 | 1/2019 | Schindler et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,318,034 B1 | 6/2019 | Hauenstein et al. | |
| 10,362,219 B2 | 7/2019 | Wilson et al. | |
| 10,387,730 B1 | 8/2019 | Cowburn et al. | |
| 10,475,225 B2 | 11/2019 | Park et al. | |
| 10,504,266 B2 | 12/2019 | Blattner et al. | |
| 10,504,287 B2 | 12/2019 | McPhee et al. | |
| 10,529,109 B1 | 1/2020 | Chen et al. | |
| 10,573,048 B2 | 2/2020 | Ni et al. | |
| 10,593,116 B2 | 3/2020 | Egri et al. | |
| 10,657,701 B2 | 5/2020 | Osman et al. | |
| 10,740,978 B2 | 8/2020 | McPhee et al. | |
| 10,990,246 B1 | 4/2021 | Law et al. | |
| 11,030,813 B2 | 6/2021 | Hare et al. | |
| 11,189,098 B2 | 11/2021 | Hare et al. | |
| 11,195,338 B2 | 12/2021 | Mcphee et al. | |
| 11,210,850 B2 | 12/2021 | Goodrich et al. | |
| 11,232,646 B2 | 1/2022 | Goodrich et al. | |
| 11,263,817 B1 | 3/2022 | Goodrich et al. | |
| 11,275,252 B2 | 3/2022 | Boriskin et al. | |
| 11,308,284 B2 | 4/2022 | Huang et al. | |
| 11,443,491 B2 | 9/2022 | Hare et al. | |

(56) References Cited

U.S. PATENT DOCUMENTS

| | | |
|---|---|---|
| 11,501,499 B2 | 11/2022 | Goodrich et al. |
| 11,580,700 B2 | 2/2023 | Egri et al. |
| 11,704,878 B2 | 7/2023 | Mcphee et al. |
| 12,217,374 B2 | 2/2025 | Mcphee et al. |
| 2002/0067362 A1 | 6/2002 | Agostino Nocera et al. |
| 2002/0169644 A1 | 11/2002 | Greene |
| 2004/0080467 A1 | 4/2004 | Chinthammit et al. |
| 2004/0212630 A1 | 10/2004 | Hobgood et al. |
| 2005/0041842 A1 | 2/2005 | Frakes et al. |
| 2005/0162419 A1 | 7/2005 | Kim et al. |
| 2005/0206610 A1 | 9/2005 | Cordelli |
| 2005/0276444 A1* | 12/2005 | Zhou ............... G06F 3/04815 382/103 |
| 2006/0294465 A1 | 12/2006 | Ronen et al. |
| 2007/0018811 A1 | 1/2007 | Gollu |
| 2007/0096678 A1 | 5/2007 | Melrose |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0078758 A1 | 4/2008 | Shimura et al. |
| 2008/0122796 A1 | 5/2008 | Jobs et al. |
| 2008/0158222 A1 | 7/2008 | Li et al. |
| 2009/0016617 A1 | 1/2009 | Bregman-Amital et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0160779 A1 | 6/2009 | Crockett et al. |
| 2009/0177976 A1 | 7/2009 | Bokor et al. |
| 2009/0202114 A1 | 8/2009 | Morin et al. |
| 2009/0215536 A1 | 8/2009 | Yee et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0251101 A1 | 9/2010 | Haussecker et al. |
| 2011/0093780 A1 | 4/2011 | Dunn |
| 2011/0115798 A1 | 5/2011 | Nayar et al. |
| 2011/0129118 A1 | 6/2011 | Hagbi et al. |
| 2011/0148864 A1 | 6/2011 | Lee et al. |
| 2011/0161242 A1 | 6/2011 | Chung et al. |
| 2011/0183732 A1 | 7/2011 | Block et al. |
| 2011/0202598 A1 | 8/2011 | Evans et al. |
| 2011/0205242 A1 | 8/2011 | Friesen |
| 2011/0239136 A1 | 9/2011 | Goldman et al. |
| 2012/0002014 A1 | 1/2012 | Walsh |
| 2012/0092329 A1 | 4/2012 | Koo et al. |
| 2012/0113106 A1 | 5/2012 | Choi et al. |
| 2012/0113223 A1 | 5/2012 | Hilliges et al. |
| 2012/0120186 A1 | 5/2012 | Diaz et al. |
| 2012/0124458 A1 | 5/2012 | Cruzada |
| 2012/0130717 A1 | 5/2012 | Xu et al. |
| 2012/0194549 A1 | 8/2012 | Osterhout et al. |
| 2012/0206558 A1 | 8/2012 | Setton |
| 2012/0209924 A1 | 8/2012 | Evans et al. |
| 2012/0224773 A1 | 9/2012 | Sweet, III et al. |
| 2012/0249416 A1 | 10/2012 | Maciocci et al. |
| 2013/0017991 A1 | 1/2013 | Niu et al. |
| 2013/0021373 A1 | 1/2013 | Vaught et al. |
| 2013/0023673 A1 | 1/2013 | Liang et al. |
| 2013/0050258 A1 | 2/2013 | Liu et al. |
| 2013/0103760 A1 | 4/2013 | Golding et al. |
| 2013/0104084 A1 | 4/2013 | Mlyniec et al. |
| 2013/0127980 A1 | 5/2013 | Haddick et al. |
| 2013/0141434 A1 | 6/2013 | Sugden et al. |
| 2013/0201187 A1 | 8/2013 | Tong et al. |
| 2013/0223673 A1 | 8/2013 | Davis et al. |
| 2013/0249948 A1 | 9/2013 | Reitan |
| 2013/0257877 A1 | 10/2013 | Davis |
| 2013/0278631 A1 | 10/2013 | Border et al. |
| 2013/0335301 A1 | 12/2013 | Wong et al. |
| 2013/0335405 A1 | 12/2013 | Scavezze et al. |
| 2014/0028713 A1 | 1/2014 | Keating et al. |
| 2014/0043329 A1 | 2/2014 | Wang et al. |
| 2014/0047380 A1 | 2/2014 | Mak |
| 2014/0055554 A1 | 2/2014 | Du et al. |
| 2014/0078176 A1 | 3/2014 | Kim et al. |
| 2014/0080560 A1 | 3/2014 | Knutsson |
| 2014/0125678 A1 | 5/2014 | Wang et al. |
| 2014/0129343 A1 | 5/2014 | Finster et al. |
| 2014/0176608 A1 | 6/2014 | Boysen et al. |
| 2014/0232652 A1 | 8/2014 | Weising et al. |
| 2014/0267410 A1 | 9/2014 | Fein et al. |
| 2014/0270703 A1 | 9/2014 | Wang et al. |
| 2014/0292645 A1 | 10/2014 | Tsurumi |
| 2014/0313228 A1 | 10/2014 | Kasahara |
| 2014/0320507 A1 | 10/2014 | Myung et al. |
| 2014/0321702 A1 | 10/2014 | Schmalstieg |
| 2014/0344762 A1 | 11/2014 | Grasset et al. |
| 2014/0351758 A1 | 11/2014 | Yoshida |
| 2014/0368535 A1 | 12/2014 | Salter et al. |
| 2014/0372957 A1 | 12/2014 | Keane et al. |
| 2015/0023602 A1 | 1/2015 | Wnuk et al. |
| 2015/0052479 A1 | 2/2015 | Ooi et al. |
| 2015/0098614 A1 | 4/2015 | Gee et al. |
| 2015/0103183 A1 | 4/2015 | Abbott et al. |
| 2015/0206349 A1 | 7/2015 | Rosenthal et al. |
| 2015/0212647 A1 | 7/2015 | Kim et al. |
| 2015/0254467 A1 | 9/2015 | Leuthardt et al. |
| 2015/0262029 A1 | 9/2015 | Pirchheim et al. |
| 2015/0264304 A1 | 9/2015 | Chastney et al. |
| 2015/0269783 A1 | 9/2015 | Yun |
| 2015/0301599 A1 | 10/2015 | Miller |
| 2015/0309698 A1 | 10/2015 | Senderek et al. |
| 2015/0316985 A1 | 11/2015 | Levesque et al. |
| 2015/0317831 A1 | 11/2015 | Ebstyne et al. |
| 2015/0356788 A1 | 12/2015 | Abe et al. |
| 2015/0366527 A1 | 12/2015 | Yu et al. |
| 2015/0371447 A1 | 12/2015 | Yasutake |
| 2016/0025978 A1 | 1/2016 | Mallinson |
| 2016/0025981 A1 | 1/2016 | Burns et al. |
| 2016/0026253 A1 | 1/2016 | Bradski et al. |
| 2016/0054837 A1 | 2/2016 | Stafford |
| 2016/0055676 A1 | 2/2016 | Kasahara et al. |
| 2016/0063600 A1 | 3/2016 | Wuang |
| 2016/0073962 A1 | 3/2016 | Yu et al. |
| 2016/0085773 A1 | 3/2016 | Chang et al. |
| 2016/0109940 A1 | 4/2016 | Lyren et al. |
| 2016/0134840 A1 | 5/2016 | Mcculloch |
| 2016/0148395 A1 | 5/2016 | Kim et al. |
| 2016/0171739 A1 | 6/2016 | Anderson et al. |
| 2016/0196692 A1* | 7/2016 | Kjallstrom ............ G06T 19/006 345/633 |
| 2016/0214011 A1 | 7/2016 | Weising et al. |
| 2016/0224123 A1* | 8/2016 | Antoniac ............ G06F 3/04815 |
| 2016/0234149 A1 | 8/2016 | Tsuda et al. |
| 2016/0266661 A1 | 9/2016 | Forsblom et al. |
| 2016/0292917 A1 | 10/2016 | Dorner et al. |
| 2016/0330522 A1 | 11/2016 | Newell et al. |
| 2016/0350967 A1 | 12/2016 | Klassen |
| 2016/0360115 A1 | 12/2016 | Rim |
| 2016/0379418 A1 | 12/2016 | Osborn et al. |
| 2017/0018112 A1 | 1/2017 | Vaganov |
| 2017/0031503 A1 | 2/2017 | Rosenberg et al. |
| 2017/0038829 A1 | 2/2017 | Lanier et al. |
| 2017/0039986 A1 | 2/2017 | Lanier et al. |
| 2017/0052946 A1 | 2/2017 | Gu et al. |
| 2017/0061696 A1 | 3/2017 | Li et al. |
| 2017/0069134 A1 | 3/2017 | Shapira et al. |
| 2017/0069255 A1 | 3/2017 | Honkanen et al. |
| 2017/0080346 A1 | 3/2017 | Abbas |
| 2017/0087473 A1 | 3/2017 | Siegel et al. |
| 2017/0090728 A1 | 3/2017 | Kim et al. |
| 2017/0090747 A1 | 3/2017 | Dash |
| 2017/0103452 A1 | 4/2017 | Hertel et al. |
| 2017/0113140 A1 | 4/2017 | Blackstock et al. |
| 2017/0118145 A1 | 4/2017 | Aittoniemi et al. |
| 2017/0132821 A1 | 5/2017 | Valliani et al. |

(56) References Cited

U.S. PATENT DOCUMENTS

| | | |
|---|---|---|
| 2017/0147680 A1 | 5/2017 | Bai et al. |
| 2017/0178272 A1 | 6/2017 | Lashkari et al. |
| 2017/0199855 A1 | 7/2017 | Fishbeck |
| 2017/0221272 A1 | 8/2017 | Li et al. |
| 2017/0229153 A1 | 8/2017 | Moore et al. |
| 2017/0235848 A1 | 8/2017 | Van Dusen et al. |
| 2017/0243352 A1 | 8/2017 | Kutliroff et al. |
| 2017/0255450 A1 | 9/2017 | Mullins et al. |
| 2017/0278308 A1 | 9/2017 | Bleiweiss et al. |
| 2017/0287060 A1 | 10/2017 | Choi et al. |
| 2017/0309057 A1 | 10/2017 | Vaganov |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0005429 A1 | 1/2018 | Osman et al. |
| 2018/0033173 A1 | 2/2018 | Choi et al. |
| 2018/0040166 A1 | 2/2018 | Jayaraj et al. |
| 2018/0046245 A1 | 2/2018 | Schwarz et al. |
| 2018/0047200 A1 | 2/2018 | O'Hara et al. |
| 2018/0061072 A1 | 3/2018 | Benezra et al. |
| 2018/0075657 A1 | 3/2018 | Lanier et al. |
| 2018/0082117 A1 | 3/2018 | Sharma et al. |
| 2018/0082430 A1 | 3/2018 | Sharma et al. |
| 2018/0083978 A1 | 3/2018 | Pantazelos |
| 2018/0108179 A1 | 4/2018 | Tomlin et al. |
| 2018/0113587 A1 | 4/2018 | Allen et al. |
| 2018/0114364 A1 | 4/2018 | Mcphee et al. |
| 2018/0114365 A1 | 4/2018 | Egri et al. |
| 2018/0115503 A1 | 4/2018 | Baldwin et al. |
| 2018/0122043 A1 | 5/2018 | Energin et al. |
| 2018/0122142 A1 | 5/2018 | Egeler et al. |
| 2018/0143748 A1 | 5/2018 | Ahmed et al. |
| 2018/0143950 A1 | 5/2018 | Al-arnaouti et al. |
| 2018/0152400 A1 | 5/2018 | Chung et al. |
| 2018/0160194 A1 | 6/2018 | Bayliss et al. |
| 2018/0174600 A1 | 6/2018 | Chaudhuri et al. |
| 2018/0189743 A1 | 7/2018 | Balasubramanian et al. |
| 2018/0190022 A1 | 7/2018 | Zamir et al. |
| 2018/0197343 A1 | 7/2018 | Hare et al. |
| 2018/0210628 A1 | 7/2018 | Mcphee et al. |
| 2018/0276882 A1 | 9/2018 | Harviainen et al. |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0330480 A1 | 11/2018 | Liu et al. |
| 2018/0336714 A1 | 11/2018 | Stoyles et al. |
| 2018/0345129 A1 | 12/2018 | Rathod |
| 2018/0349451 A1 | 12/2018 | O'connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0034076 A1 | 1/2019 | Vinayak et al. |
| 2019/0057616 A1 | 2/2019 | Cohen et al. |
| 2019/0073834 A1 | 3/2019 | Holzer et al. |
| 2019/0107991 A1 | 4/2019 | Spivack et al. |
| 2019/0188920 A1 | 6/2019 | Mcphee et al. |
| 2019/0221031 A1 | 7/2019 | De La Carcova et al. |
| 2019/0251720 A1 | 8/2019 | Hariton |
| 2019/0304189 A1 | 10/2019 | Falstrup et al. |
| 2019/0311341 A1 | 10/2019 | Rice |
| 2019/0342507 A1 | 11/2019 | Dye et al. |
| 2019/0347865 A1 | 11/2019 | Hackett et al. |
| 2019/0385378 A1 | 12/2019 | Bastian et al. |
| 2020/0066014 A1 | 2/2020 | Mehta et al. |
| 2020/0066052 A1 | 2/2020 | Antonsen et al. |
| 2020/0074738 A1 | 3/2020 | Hare et al. |
| 2020/0082535 A1 | 3/2020 | Lindskog et al. |
| 2020/0105006 A1 | 4/2020 | Karsch et al. |
| 2020/0167995 A1 | 5/2020 | Hare et al. |
| 2020/0184731 A1 | 6/2020 | Egri et al. |
| 2020/0202632 A1 | 6/2020 | Goodrich et al. |
| 2020/0327734 A1 | 10/2020 | Goodrich et al. |
| 2020/0334916 A1 | 10/2020 | Mcphee et al. |
| 2020/0380259 A1 | 12/2020 | Cahill et al. |
| 2020/0410763 A1 | 12/2020 | Hare et al. |
| 2021/0042993 A1 | 2/2021 | Tagra et al. |
| 2021/0074074 A1 | 3/2021 | Goodrich et al. |
| 2021/0132686 A1 | 5/2021 | Awaji |
| 2021/0174600 A1 | 6/2021 | Hare et al. |
| 2021/0241537 A1 | 8/2021 | Ahn |
| 2021/0256773 A1 | 8/2021 | Jevans |
| 2021/0264668 A1 | 8/2021 | Goodrich et al. |
| 2022/0036660 A1 | 2/2022 | Mcphee et al. |
| 2022/0044311 A1 | 2/2022 | Ray |
| 2022/0076504 A1 | 3/2022 | Goodrich et al. |
| 2022/0121874 A1 | 4/2022 | Mayes et al. |
| 2022/0375178 A1 | 11/2022 | Hare et al. |
| 2023/0245401 A1 | 8/2023 | Mcphee et al. |
| 2023/0305675 A1 | 9/2023 | Mcphee et al. |

FOREIGN PATENT DOCUMENTS

| | | |
|---|---|---|
| CN | 102884490 A | 1/2013 |
| CN | 103460255 A | 12/2013 |
| CN | 103460256 A | 12/2013 |
| CN | 104081317 A | 10/2014 |
| CN | 104764452 A | 7/2015 |
| CN | 105210116 A | 12/2015 |
| CN | 105283834 A | 1/2016 |
| CN | 105607034 A | 5/2016 |
| CN | 109863510 A | 6/2019 |
| CN | 109863532 A | 6/2019 |
| CN | 110168476 A | 8/2019 |
| CN | 110168478 A | 8/2019 |
| CN | 110199245 A | 9/2019 |
| CN | 112639691 A | 4/2021 |
| CN | 113330484 A | 8/2021 |
| CN | 114026831 A | 2/2022 |
| CN | 114341780 A | 4/2022 |
| CN | 110168476 B | 11/2022 |
| CN | 110168478 B | 1/2023 |
| CN | 115641424 A | 1/2023 |
| CN | 115933886 A | 4/2023 |
| EP | 2184092 A2 | 5/2010 |
| EP | 3086292 A1 | 10/2016 |
| EP | 3506213 A1 | 7/2019 |
| EP | 3566111 B1 | 9/2023 |
| GB | 201404134 | 4/2014 |
| JP | 2001230801 A | 8/2001 |
| JP | 2005258821 A | 9/2005 |
| JP | 2013164697 A | 8/2013 |
| JP | 5497931 B2 | 3/2014 |
| KR | 20100121420 | 11/2010 |
| KR | 20120061197 A | 6/2012 |
| KR | 20130119473 A | 10/2013 |
| KR | 20140020871 A | 2/2014 |
| KR | 101445263 B1 | 9/2014 |
| KR | 20150013709 A | 2/2015 |
| KR | 20150038272 A | 4/2015 |
| KR | 20150126938 A | 11/2015 |
| KR | 20160019964 A | 2/2016 |
| KR | 20190075977 A | 7/2019 |
| KR | 102254709 B1 | 5/2021 |
| KR | 102257167 B1 | 5/2021 |
| KR | 102317167 B1 | 10/2021 |
| KR | 102367928 B1 | 3/2022 |
| KR | 102406297 B1 | 6/2022 |
| KR | 102406437 B1 | 6/2022 |
| KR | 102482293 B1 | 12/2022 |
| KR | 102491191 B1 | 1/2023 |
| KR | 102577968 B1 | 9/2023 |
| KR | 102606601 B1 | 11/2023 |
| KR | 102643741 B1 | 2/2024 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2011109126 A1 | 9/2011 |
| WO | WO-2012139276 A1 | 10/2012 |
| WO | WO-2013017991 A1 | 2/2013 |
| WO | WO-2013027893 A1 | 2/2013 |
| WO | WO-2013152454 A1 | 10/2013 |

(56) References Cited

FOREIGN PATENT DOCUMENTS

| | | |
|---|---|---|
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018081125 A1 | 5/2018 |
| WO | WO-2018102562 A1 | 6/2018 |
| WO | WO-2018122167 A1 | 7/2018 |
| WO | WO-2018128930 | 7/2018 |
| WO | WO-2018129531 | 7/2018 |
| WO | WO-2018129531 A1 | 7/2018 |
| WO | WO-2018136222 | 7/2018 |
| WO | WO-2019089613 A1 | 5/2019 |
| WO | WO-2020047117 A1 | 3/2020 |
| WO | WO-2020132541 A1 | 6/2020 |
| WO | WO-2020264551 A2 | 12/2020 |
| WO | WO-2021003499 A1 | 1/2021 |
| WO | WO-2020264551 A3 | 2/2021 |
| WO | WO-2021046582 A1 | 3/2021 |

OTHER PUBLICATIONS

US 11,551,423 B2, 01/2023, Egri et al. (withdrawn)

"U.S. Appl. No. 15/792,347, Final Office Action mailed Jul. 9, 2019", 13 pgs.

"U.S. Appl. No. 15/792,347, Non Final Office Action mailed Mar. 21, 2019", 12 pgs.

"U.S. Appl. No. 15/792,347, Notice of Allowance mailed Aug. 5, 2019", 9 pgs.

"U.S. Appl. No. 15/792,347, Response filed Apr. 22, 2019 to Non Final Office Action mailed Mar. 21, 2019", 9 pgs.

"U.S. Appl. No. 15/792,347, Response filed Jul. 16, 2019 to Final Office Action mailed Jul. 9, 2019", 9 pgs.

"U.S. Appl. No. 15/804,550, Final Office Action mailed Jan. 31, 2023", 29 pgs.

"U.S. Appl. No. 16/242,708, Corrected Notice of Allowability mailed Feb. 23, 2021", 2 pgs.

"U.S. Appl. No. 16/242,708, Examiner Interview Summary mailed Jul. 29, 2020", 3 pgs.

"U.S. Appl. No. 16/242,708, Final Office Action mailed Jul. 2, 2020", 25 pgs.

"U.S. Appl. No. 16/242,708, Non Final Office Action mailed Feb. 28, 2020", 19 pgs.

"U.S. Appl. No. 16/242,708, Notice of Allowance mailed Feb. 4, 2021", 7 pgs.

"U.S. Appl. No. 16/242,708, Notice of Allowance mailed Aug. 19, 2020", 5 pgs.

"U.S. Appl. No. 16/242,708, Notice of Allowance mailed Nov. 4, 2020", 7 pgs.

"U.S. Appl. No. 16/242,708, Response filed May 15, 2020 to Non Final Office Action mailed Feb. 28, 2020", 11 pgs.

"U.S. Appl. No. 16/242,708, Response filed Aug. 5, 2020 to Final Office Action mailed Jul. 2, 2020", 11 pgs.

"U.S. Appl. No. 16/457,461, Corrected Notice of Allowability mailed Feb. 26, 2021", 2 pgs.

"U.S. Appl. No. 16/457,461, Examiner Interview Summary mailed Jul. 10, 2020", 3 pgs.

"U.S. Appl. No. 16/457,461, Final Office Action mailed Jul. 14, 2020", 16 pgs.

"U.S. Appl. No. 16/457,461, Non Final Office Action mailed Apr. 16, 2020", 13 pgs.

"U.S. Appl. No. 16/457,461, Notice of Allowance mailed Apr. 14, 2021", 7 pgs.

"U.S. Appl. No. 16/457,461, Notice of Allowance mailed Jul. 28, 2021", 5 pgs.

"U.S. Appl. No. 16/457,461, Notice of Allowance mailed Sep. 2, 2020", 7 pgs.

"U.S. Appl. No. 16/457,461, Notice of Allowance mailed Nov. 19, 2020", 8 pgs.

"U.S. Appl. No. 16/457,461, Response filed Jul. 1, 2020 to Non Final Office Action mailed Apr. 16, 2020", 9 pgs.

"U.S. Appl. No. 16/457,461, Response filed Aug. 20, 2020 to Final Office Action mailed Jul. 14, 2020", 8 pgs.

"U.S. Appl. No. 16/460,519, Advisory Action mailed Mar. 9, 2021", 4 pgs.

"U.S. Appl. No. 16/460,519, Final Office Action mailed Jan. 6, 2021", 33 pgs.

"U.S. Appl. No. 16/460,519, Non Final Office Action mailed Mar. 17, 2021", 37 pgs.

"U.S. Appl. No. 16/460,519, Non Final Office Action mailed Sep. 4, 2020", 27 pgs.

"U.S. Appl. No. 16/460,519, Notice of Allowance mailed Jul. 12, 2021", 5 pgs.

"U.S. Appl. No. 16/460,519, Response filed Feb. 23, 2021 to Final Office Action mailed Jan. 6, 2021", 10 pgs.

"U.S. Appl. No. 16/460,519, Response filed Jun. 15, 2021 to Non Final Office Action mailed Mar. 17, 2021", 10 pgs.

"U.S. Appl. No. 16/460,519, Response filed Dec. 2, 2020 to Non Final Office Action mailed Sep. 4, 2020", 10 pgs.

"U.S. Appl. No. 16/579,463, Non Final Office Action mailed Oct. 21, 2019", 8 pgs.

"U.S. Appl. No. 16/579,463, Response filed Nov. 11, 2019 to Non Final Office Action mailed Oct. 21, 2019", 10 pgs.

"U.S. Appl. No. 16/696,600, 312 Amendment filed Jul. 7, 2021", 7 pgs.

"U.S. Appl. No. 16/696,600, Corrected Notice of Allowability mailed May 12, 2021", 2 pgs.

"U.S. Appl. No. 16/696,600, Corrected Notice of Allowability mailed Jul. 21, 2021", 3 pgs.

"U.S. Appl. No. 16/696,600, Corrected Notice of Allowability mailed Sep. 8, 2021", 2 pgs.

"U.S. Appl. No. 16/696,600, Non Final Office Action mailed Sep. 15, 2020", 20 pgs.

"U.S. Appl. No. 16/696,600, Notice of Allowability mailed Jan. 26, 2021", 2 pgs.

"U.S. Appl. No. 16/696,600, Notice of Allowance mailed May 4, 2021", 9 pgs.

"U.S. Appl. No. 16/696,600, Notice of Allowance mailed Aug. 17, 2021", 8 pgs.

"U.S. Appl. No. 16/696,600, Notice of Allowance mailed Dec. 18, 2020", 11 pgs.

"U.S. Appl. No. 16/696,600, Response filed Oct. 30, 2020 to Non Final Office Action mailed Sep. 15, 2020", 8 pgs.

"U.S. Appl. No. 16/721,418, Final Office Action mailed Aug. 4, 2021", 31 pgs.

"U.S. Appl. No. 16/721,418, Non Final Office Action mailed Apr. 29, 2021", 28 pgs.

"U.S. Appl. No. 16/721,418, Response filed Jul. 28, 2021 to Non Final Office Action mailed Apr. 29, 2021", 11 pgs.

"U.S. Appl. No. 16/721,418, Response filed Oct. 4, 2021 to Final Office Action mailed Aug. 4, 2021", 12 pgs.

"U.S. Appl. No. 16/721,459, Non Final Office Action mailed Apr. 15, 2021", 17 pgs.

"U.S. Appl. No. 16/721,459, Notice of Allowance mailed Aug. 19, 2021", 10 pgs.

"U.S. Appl. No. 16/721,459, Response filed Jul. 6, 2021 to Non Final Office Action mailed Apr. 15, 2021", 10 pgs.

"U.S. Appl. No. 16/723,540, Amendment Under 37 C.F.R. 1.312 filed Sep. 20, 2022" 8 pgs.

"U.S. Appl. No. 16/723,540, Examiner Interview Summary mailed Jun. 16, 2021", 2 pgs.

"U.S. Appl. No. 16/723,540, Final Office Action mailed Sep. 27, 2021", 18 pgs.

"U.S. Appl. No. 16/723,540, Non Final Office Action mailed Jan. 26, 2022", 19 pgs.

"U.S. Appl. No. 16/723,540, Non Final Office Action mailed Mar. 18, 2021", 15 pgs.

"U.S. Appl. No. 16/723,540, Notice of Allowance mailed Jun. 29, 2022", 5 pgs.

"U.S. Appl. No. 16/723,540, PTO Response to Rule 312 Communication mailed Sep. 29, 2022", 2 pgs.

(56) References Cited

OTHER PUBLICATIONS

"U.S. Appl. No. 16/723,540, Response filed Apr. 26, 2022 to Non Final Office Action mailed Jan. 26, 2022" 10 pgs.
"U.S. Appl. No. 16/723,540, Response filed Jun. 16, 2021 to Non Final Office Action mailed Mar. 18, 2021", 10 pgs.
"U.S. Appl. No. 16/723,540, Response filed Dec. 23, 2021 to Final Office Action mailed Sep. 27, 2021", 10 pgs.
"U.S. Appl. No. 16/723,540, Supplemental Notice of Allowability mailed Aug. 15, 2022", 8 pgs.
"U.S. Appl. No. 16/723,540, Supplemental Notice of Allowability mailed Sep. 29, 2022", 2 pgs.
"U.S. Appl. No. 16/747,318, 312 Amendment filed Nov. 5, 2021", 7 pgs.
"U.S. Appl. No. 16/747,318, Corrected Notice of Allowability mailed Dec. 22, 2021", 2 pgs.
"U.S. Appl. No. 16/747,318, Examiner Interview Summary mailed Mar. 12, 2021", 2 pgs.
"U.S. Appl. No. 16/747,318, Final Office Action mailed May 12, 2021", 14 pgs.
"U.S. Appl. No. 16/747,318, Non Final Office Action mailed Dec. 15, 2020", 11 pgs.
"U.S. Appl. No. 16/747,318, Notice of Allowance mailed Sep. 9, 2021", 6 pgs.
"U.S. Appl. No. 16/747,318, PTO Response to Rule 312 Communication mailed Nov. 23, 2021", 3 pgs.
"U.S. Appl. No. 16/747,318, Response filed Mar. 15, 2021 to Non Final Office Action mailed Dec. 15, 2020", 11 pgs.
"U.S. Appl. No. 16/747,318, Response filed Aug. 12, 2021 to Final Office Action mailed May 12, 2021", 11 pgs.
"U.S. Appl. No. 17/249,092, Notice of Allowability mailed Aug. 12, 2022", 2 pgs.
"U.S. Appl. No. 17/249,092, Notice of Allowance mailed May 4, 2022", 12 pgs.
"U.S. Appl. No. 17/307,354, Final Office Action mailed Dec. 29, 2022", 30 pgs.
"U.S. Appl. No. 17/307,354, Non Final Office Action mailed Jun. 24, 2022", 29 pgs.
"U.S. Appl. No. 17/307,354, Response filed Sep. 20, 2022 to Non Final Office Action mailed Jun. 24, 2022", 13 pgs.
"U.S. Appl. No. 17/319,399, Non Final Office Action mailed Apr. 22, 2022", 8 pgs.
"U.S. Appl. No. 17/319,399, Notice of Allowance mailed Aug. 25, 2022", 9 pgs.
"U.S. Appl. No. 17/319,399, Response filed Jul. 21, 2022 to Non Final Office Action mailed Apr. 22, 2022", 8 pgs.
"U.S. Appl. No. 17/505,370, Notice of Allowability mailed Jun. 1, 2023", 2 pgs.
"U.S. Appl. No. 17/505,370, Notice of Allowance mailed Jan. 13, 2023", 8 pgs.
"U.S. Appl. No. 17/527,376, Non Final Office Action mailed Nov. 10, 2022", 20 pgs.
"U.S. Appl. No. 18/326,681, Preliminary Amendment filed Jun. 9, 2023", 5 pgs.
"Chinese Application Serial No. 201780065649.3, Office Action mailed Jun. 8, 2023", w/ English translation, 10 pgs.
"Chinese Application Serial No. 201780065649.3, Office Action mailed Dec. 2, 2022", W/English Translation, 11 pgs.
"Chinese Application Serial No. 201780084184.6, Office Action mailed Feb. 7, 2022", w/ English translation, 22 pgs.
"Chinese Application Serial No. 201780084184.6, Office Action mailed Jul. 29, 2022", W/English Translation, 18 pgs.
"Chinese Application Serial No. 201780084184.6, Response filed Oct. 13, 2022 to Office Action mailed Jul. 29, 2022", w/ English Claims, 12 pgs.
"Chinese Application Serial No. 202211271509.0, Voluntary Amendment Filed Apr. 18, 2023", w/ English Claims, 19 pgs.
"European Application Serial No. 20775562.0, Response to Communication pursuant to Rules 161 and 162 filed Sep. 27, 2022", 23 pgs.

"European Application Serial No. 17865596.5, EPO Written Decision to Refuse mailed Jul. 12, 2023", 15 pgs.
"European Application Serial No. 17865596.5, Summons to Attend Oral Proceedings mailed Jan. 4, 2023", 11 pgs.
"European Application Serial No. 19769288.2, Response filed Sep. 29, 2021 to Communication Pursuant to Rules 161(1) and 162 EPC mailed Apr. 8, 2021", 24 pgs.
"European Application Serial No. 19845741.8, Response filed Feb. 3, 2022 to Communication Pursuant to Rules 161 and 162 EPC mailed Jul. 27, 2021", 19 pgs.
"European Application Serial No. 23153345.6, Extended European Search Report mailed May 8, 2023", 9 pgs.
"International Application Serial No. PCT/US2019/048597, International Preliminary Report on Patentability mailed Mar. 11, 2021", 10 pgs.
"International Application Serial No. PCT/US2019/068007, International Preliminary Report on Patentability mailed Jul. 1, 2021", 17 pgs.
"International Application Serial No. PCT/US2019/068007, International Search Report mailed Apr. 30, 2020", 10 pgs.
"International Application Serial No. PCT/US2019/068007, Invitation to Pay Additional Fees mailed Mar. 11, 2020", 18 pgs.
"International Application Serial No. PCT/US2019/068007, Written Opinion mailed Apr. 30, 2020", 15 pgs.
"International Application Serial No. PCT/US2020/070158, International Preliminary Report on Patentability mailed Jan. 6, 2022", 14 pgs.
"International Application Serial No. PCT/US2020/070158, International Search Report mailed Dec. 17, 2020", 5 pgs.
"International Application Serial No. PCT/US2020/070158, Invitation to Pay Additional Fees mailed Oct. 1, 2020", 12 pgs.
"International Application Serial No. PCT/US2020/070158, Written Opinion mailed Dec. 17, 2020", 12 pgs.
"International Application Serial No. PCT/US2020/070230, International Search Report mailed Nov. 5, 2020", 7 pgs.
"International Application Serial No. PCT/US2020/070230, Invitation to Pay Additional Fees mailed Sep. 15, 2020", 16 pgs.
"International Application Serial No. PCT/US2020/070230, Written Opinion mailed Nov. 5, 2020", 14 pgs.
"International Application Serial No. PCT/US2020/070503, International Preliminary Report on Patentability mailed Mar. 17, 2022". 9 pgs.
"International Application Serial No. PCT/US2020/070503, International Search Report mailed Dec. 2, 2020", 5 pgs.
"International Application Serial No. PCT/US2020/070503, Written Opinion mailed Dec. 2, 2020", 7 pgs.
"Korean Application Serial No. 10-2022-7018662, Office Action mailed Dec. 27, 2022", w/ English Translation, 5 pgs.
"Korean Application Serial No. 10-2022-7018734, Notice of Preliminary Rejection mailed Jun. 15, 2022", w/ English translation, 12 pgs.
"Korean Application Serial No. 10-2022-7018734, Response filed Jul. 22, 2022 to Notice of Preliminary Rejection mailed Jun. 15, 2022", w/ English Claims, 18 pgs.
"Korean Application Serial No. 10-2022-7045427, Notice of Preliminary Rejection mailed Mar. 13, 2023", w/ English Translation, 15 pgs.
"Korean Application Serial No. 10-2023-7002059, Notice of Preliminary Rejection mailed Feb. 15, 2023", w/ English Translation, 9 pgs.
"Korean Application Serial No. 10-2023-7002059, Response filed Apr. 6, 2023 to Notice of Preliminary Rejection mailed Feb. 15, 2023", w/ English Claims, 24 pgs.
"Mirror my texture", C4dcafe, [Online] Retrieved from the Internet: <URL: https://www.c4dcafe.com/ipb/forums/topic/95957-mirror-my-texture/)>, (2016), 3 pgs.
"Mobile Keyboard", Unity User Manual, Website, historical copy retrieved from web archive: <https://web.archive.org/web/20181204043559/https://docs.unity3d.com/Manual/MobileKeyboard.html> on Apr. 20, 2021, (Dec. 4, 2018), 5 pgs.
Deepu, R, et al., "3D Reconstruction from Single 2D Image", International Journal of Latest Research in Engineering and Technology (IJLRET), 2(1), (Jan. 2016), 42-51.

(56) References Cited

OTHER PUBLICATIONS

Fuccella, Vittorio, et al., "Gestures and Widgets: Performance in Text Editing on Multi-Touch Capable Mobile Devices", ACM, CHI '13: Proceedings of the SIGCHI Conference on Human Factors in Computing Systems, (Apr. 2013), 2785-2794.

Giaccone, P R, et al., "Foreground-background segmentation by cellular neural networks", IEEE 15th International Conference on Pattern Recognition (ICPR-2000), vol. 2, (2000), 438-441.

Kawai, Norihiko, et al., "Diminished Reality Based on Image Inpainting Considering Background Geometry", IEEE transactions on visualization and computer graphics, 22(3), (Mar. 1, 2016), 1236-1247.

Keeler, Alice, "Google Slides: Make a Draggable Stack", Teacher Tech with Alice Keeler, [Online] Retrieved from the Internet: <URL: https://alicekeeler.com/2017/04/10/google-slides-make-draggable-stack/>, (2017), 9 pgs.

Long, et al., "Context-Aware Mixed Reality: A Framework for Ubiquitous Interaction", arXiv:1803.05541v1, Cornell University Library, Ithaca, NY, (Mar. 14, 2018), 11 pgs.

Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.

Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.

Park, Jungsik, et al., "[Poster] Interactive deformation of real objects", 2014 IEEE International Symposium on Mixed and Augmented Reality (ISMAR), (Sep. 10, 2014), 295-296.

Pixovert, "Create Ray Traced 3D Text in After Effects CS6", Youtube Video, [Online] Retrieved from the Internet: <URL: https://www.youtube.com/watch?v=qGbVQRTrhXM>, (Mar. 24, 2013), 15 pgs.; 7:09 min.

Ranganathan, Parthasarathy, et al., "Energy-Aware User Interfaces and Energy-Adaptive Displays", IEEE, Computer, vol. 39, Issue 3, (Mar. 20, 2006), 31-38.

Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.

Salas-Morena, Renato F, et al., "Dense Planar Slam", IEEE Intl. Symposium on Mixed and Augmented Reality (ISMAR), Munich, Germany, [Online] Retrieved from the Internet: <URL: http://www.doc.ic.ac.uk/~bglocker/pdfs/salas-moreno2014ismar.pdf>, (Jan. 14, 2014), 8 pgs.

Schettini, R, et al., "A segmentation algorithm for color images", Pattern Recognition Letters, Elsevier, Amsterdam, NL, vol. 14, No. 6, (Jun. 1, 1993), 499-506.

Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.

Singh, Gurjinder, et al., "Ubiquitous hybrid tracking techniques for augmented reality applications", IEEE 2nd International Conference on Recent Advances In Engineering & Computational Sciences, (Dec. 21, 2015), 1-5.

Wang, Nanyang, et al., "Pixel2mesh: Generating 3d mesh models from single rgb images", Proceedings of the European Conference on Computer Vision (ECCV); arXIv:1804.01654v2 [cs.CV], (2018), 16 pgs.

Ward, Caleb, "5 Creative Ways to Use Layer Stacking in After Effects", RocketStock Blog, [Online] Retrieved from the Internet: <URL: https://www.rocketstock.com/blog/5-creative-ways-use-layer-stacking-effects/>, (2015), 9 pgs.

Yang, Jie, et al., "A Real-Time Face Tracker", Proceedings of the 3rd IEEE Workshop on Applications of Computer Vision (WACV'96), (Dec. 4, 1996), 142-147.

et al., "A Tangible Volume for Portable 3D Interaction", Internet Posting, [Online] Retrieved from the internet: <https://www.youtube.com/watch?v=LP7GG6t2j-g>, (Sep. 27, 2016), 23 pgs; 3:21 min.

"U.S. Appl. No. 15/581,994, Corrected Notice of Allowability mailed Jan. 7, 2020", 2 pgs.

"U.S. Appl. No. 15/581,994, Corrected Notice of Allowability mailed Feb. 18, 2020", 3 pgs.

"U.S. Appl. No. 15/581,994, Final Office Action mailed Dec. 3, 2018", 18 pgs.

"U.S. Appl. No. 15/581,994, Non Final Office Action mailed Jun. 6, 2019", 15 pgs.

"U.S. Appl. No. 15/581,994, Non Final Office Action mailed Jun. 26, 2018", 14 pgs.

"U.S. Appl. No. 15/581,994, Notice of Allowance mailed Nov. 6, 2019", 8 pgs.

"U.S. Appl. No. 15/581,994, Response filed Feb. 26, 2019 to Final Office Action mailed Dec. 3, 2018", 11 pgs.

"U.S. Appl. No. 15/581,994, Response filed Sep. 26, 2018 to Non Final Office Action mailed Jun. 26, 2018", 11 pgs.

"U.S. Appl. No. 15/581,994, Response filed Aug. 19, 2019 to Non-Final Office Action mailed Jun. 6, 2019", 12 pgs.

"U.S. Appl. No. 15/804,550, Advisory Action mailed Jul. 23, 2021", 3 pgs.

"U.S. Appl. No. 15/804,550, Examiner Interview Summary mailed Feb. 7, 2022", 3 pgs.

"U.S. Appl. No. 15/804,550, Examiner Interview Summary mailed Jun. 8, 2022", 3 pgs.

"U.S. Appl. No. 15/804,550, Final Office Action mailed Apr. 4, 2022", 31 pgs.

"U.S. Appl. No. 15/804,550, Final Office Action mailed May 13, 2021", 25 pgs.

"U.S. Appl. No. 15/804,550, Final Office Action mailed Jul. 23, 2020", 24 pgs.

"U.S. Appl. No. 15/804,550, Final Office Action mailed Sep. 19, 2019", 23 pgs.

"U.S. Appl. No. 15/804,550, Non Final Office Action mailed Feb. 6, 2020", 24 pgs.

"U.S. Appl. No. 15/804,550, Non Final Office Action mailed Apr. 18, 2019", 18 pgs.

"U.S. Appl. No. 15/804,550, Non Final Office Action mailed Aug. 9, 2022", 28 pgs.

"U.S. Appl. No. 15/804,550, Non Final Office Action mailed Oct. 29, 2021", 31 pgs.

"U.S. Appl. No. 15/804,550, Non Final Office Action mailed Dec. 23, 2020", 24 pgs.

"U.S. Appl. No. 15/804,550, Response filed Jan. 21, 2020 to Final Office Action mailed Sep. 19, 2019", 10 pgs.

"U.S. Appl. No. 15/804,550, Response filed Jan. 31, 2022 to Non Final Office Action mailed Oct. 29, 2021", 10 pgs.

"U.S. Appl. No. 15/804,550, Response filed Mar. 23, 2021 to Non Final Office Action mailed Dec. 23, 2020", 9 pgs.

"U.S. Appl. No. 15/804,550, Response filed Jun. 8, 2020 to Non Final Office Action mailed Feb. 6, 2020", 10 pgs.

"U.S. Appl. No. 15/804,550, Response filed Jul. 5, 2022 to Final Office Action mailed Apr. 4, 2022", 11 pgs.

"U.S. Appl. No. 15/804,550, Response filed Jul. 13, 2021 to Final Office Action mailed May 13, 2021", 10 pgs.

"U.S. Appl. No. 15/804,550, Response filled Oct. 23, 2020 to Final Office Action mailed Jul. 23, 2020", 10 pgs.

"U.S. Appl. No. 15/804,550, Response filed Nov. 8, 2022 to Non Final Office Action mailed Aug. 9, 2022", 10 pgs.

"U.S. Appl. No. 15/804,550, Response filed Aug. 9, 2019 to Non-Final Office Action mailed Apr. 18, 2019", 12 pgs.

"U.S. Appl. No. 15/863,575, Non Final Office Action mailed Aug. 9, 2018", 14 pgs.

"U.S. Appl. No. 15/863,575, Notice of Allowance mailed Nov. 15, 2018", 8 pgs.

"U.S. Appl. No. 15/863,575, Response filed Sep. 24, 2018 to Non Final Office Action mailed Aug. 9, 2018", 9 pgs.

"U.S. Appl. No. 16/283,482, Examiner Interview Summary mailed Feb. 19, 2020", 3 pgs.

"U.S. Appl. No. 16/283,482, Final Office Action mailed Dec. 16, 2019", 15 pgs.

(56) References Cited

OTHER PUBLICATIONS

"U.S. Appl. No. 16/283,482, Non Final Office Action mailed Jun. 26, 2019", 13 pgs.
"U.S. Appl. No. 16/283,482, Notice of Allowance mailed Apr. 2, 2020", 9 pgs.
"U.S. Appl. No. 16/283,482, Response filed Mar. 9, 2020 to Final Office Action mailed Dec. 16, 2019", 11 pgs.
"U.S. Appl. No. 16/283,482, Response filed Sep. 26, 2019 to Non Final Office Action mailed Jun. 26, 2019", 13 pgs.
"U.S. Appl. No. 16/790,322, 312 Amendment filed Oct. 12, 2022", 8 pgs.
"U.S. Appl. No. 16/790,322, Corrected Notice of Allowability mailed Jan. 19, 2023", 2 pgs.
"U.S. Appl. No. 16/790,322, Corrected Notice of Allowability mailed Feb. 15, 2022", 2 pgs.
"U.S. Appl. No. 16/790,322, Corrected Notice of Allowability mailed Oct. 27, 2022", 2 pgs.
"U.S. Appl. No. 16/790,322, Corrected Notice of Allowability mailed Dec. 13, 2022", 2 pgs.
"U.S. Appl. No. 16/790,322, Examiner Interview Summary mailed Jun. 14, 2021", 2 pgs.
"U.S. Appl. No. 16/790,322, Final Office Action mailed May 3, 2021", 22 pgs.
"U.S. Appl. No. 16/790,322, Non Final Office Action mailed Nov. 25, 2020", 21 pgs.
"U.S. Appl. No. 16/790,322, Notice of Allowance mailed Jul. 27, 2022", 8 pgs.
"U.S. Appl. No. 16/790,322, Notice of Allowance mailed Aug. 31, 2022", 8 pgs.
"U.S. Appl. No. 16/790,322, Notice of Allowance mailed Nov. 29, 2021", 8 pgs.
"U.S. Appl. No. 16/790,322, Response filed Feb. 25, 2021 to Non Final Office Action mailed Nov. 25, 2020", 9 pgs.
"U.S. Appl. No. 16/790,322, Response filed Aug. 2, 2021 to Final Office Action mailed May 3, 2021", 10 pgs.
"U.S. Appl. No. 16/922,618, Non Final Office Action mailed Apr. 27, 2021", 9 pgs.
"U.S. Appl. No. 16/922,618, Notice of Allowance mailed Aug. 4, 2021", 9 pgs.
"U.S. Appl. No. 16/922,618, Response filed Jun. 17, 2021 to Non Final Office Action mailed Apr. 27, 2021", 7 pgs.
"U.S. Appl. No. 17/505,370, Non Final Office Action mailed Oct. 17, 2022", 16 pgs.
"U.S. Appl. No. 17/505,370, Response filed Dec. 21, 2022 to Non Final Office Action mailed Oct. 17, 2022", 8 pgs.
"Chinese Application Serial No. 201880006129.X, Response to Examiner Telephone Interview filed Sep. 22, 2022", With English machine translation, 102 pgs.
"Chinese Application Serial No. 201780082612.1, Office Action mailed Jan. 29, 2022", w/ English translation, 16 pgs.
"Chinese Application Serial No. 201880006129, Response filed Aug. 29, 2022 to Office Action mailed Jun. 17, 2022", w/ English Claims, 14 pgs.
"Chinese Application Serial No. 201880006129.X, Office Action mailed Jan. 5, 2022", w/ English translation, 18 pgs.
"Chinese Application Serial No. 201880006129.X, Office Action mailed Jun. 17, 2022", w/ English translation, 13 pgs.
"Chinese Application Serial No. 201880006129.X, Response filed Apr. 20, 2022 toOffice Action mailed Jan. 5, 2022", With Concise Statement, 10 pgs.
"European Application Serial No. 17835983.2, Response to Communication Pursuant to Rules 161(1) and 162 EPC filed Feb. 19, 2020", 11 pgs.
"European Application Serial No. 17835985.7 Response to Communication Pursuant to Rules 161(1) and 162 EPC filed Feb. 21, 2020", 10 pgs.
"European Application Serial No. 18713732.8, Response to Communication Pursuant to Rules 161(1) and 162 EPC filed Feb. 19, 2020", 25 pgs.

"European Application Serial No. 17835983.2, Communication Pursuant to Article 94(3) EPC mailed Aug. 24, 2021", 7 pgs.
"European Application Serial No. 17835983.2, Response Filed Mar. 2, 2022 to Communication Pursuant to Article 94(3) EPC mailed Aug. 24, 2021", 12 pgs.
"European Application Serial No. 17835985.7, Communication Pursuant to Article 94(3) EPC mailed Nov. 15, 2021", 10 pgs.
"European Application Serial No. 17865596.5, Communication Pursuant to Article 94(3) EPC mailed Sep. 23, 2021", 6 pgs.
"European Application Serial No. 17865596.5, Extended European Search Report mailed Sep. 13, 2019", 11 pgs.
"European Application Serial No. 17865596.5, Response filed Jan. 31, 2022 to Communication Pursuant to Article 94(3) EPC mailed Sep. 23, 2021", w/English claims, 16 pgs.
"European Application Serial No. 17865596.5, Response filed Apr. 9, 2020 to Extended European Search Report mailed Sep. 13, 2019", 21 pgs.
"European Application Serial No. 21153993.7, Extended European Search Report mailed May 12, 2021", 9 pgs.
"International Application Serial No. PCT/US2017/058093, International Preliminary Report on Patentability mailed May 9, 2019", 6 pgs.
"International Application Serial No. PCT/US2017/058093, International Search Report mailed Jan. 4, 2018", 2 pgs.
"International Application Serial No. PCT/US2017/058093, Written Opinion mailed Jan. 4, 2018", 4 pgs.
"International Application Serial No. PCT/US2017/068988, International Preliminary Report on Patentability mailed Jul. 18, 2018", 8 pgs.
"International Application Serial No. PCT/US2017/068988, International Search Report mailed Apr. 5, 2018", 3 pgs.
"International Application Serial No. PCT/US2017/068988, Written Opinion mailed Apr. 5, 2018", 6 pgs.
"International Application Serial No. PCT/US2017/069061, International Preliminary Report on Patentability mailed Aug. 1, 2019", 8 pgs.
"International Application Serial No. PCT/US2017/069061, International Search Report mailed Apr. 10, 2018", 5 pgs.
"International Application Serial No. PCT/US2017/069061, Written Opinion mailed Apr. 10, 2018", 6 pgs.
"International Application Serial No. PCT/US2018/012967, International Preliminary Report on Patentability mailed Jul. 18, 2019", 8 pgs.
"International Application Serial No. PCT/US2018/012967, International Search Report mailed May 15, 2018", 5 pgs.
"International Application Serial No. PCT/US2018/012967, Written Opinion mailed May 15, 2018", 6 pgs.
"International Application Serial No. PCT/US2019/048597, International Search Report mailed Dec. 2, 2019", 5 pgs.
"International Application Serial No. PCT/US2019/048597, Written Opinion mailed Dec. 2, 2019", 8 pgs.
"Korean Application Serial No. 10-2019-7014554, Final Office Action mailed May 25, 2021", w/ English Translation, 6 pgs.
"Korean Application Serial No. 10-2019-7014554, Notice of Preliminary Rejection mailed Nov. 27, 2020", w/ English Translation, 7 pgs.
"Korean Application Serial No. 10-2019-7014554, Response filed Jan. 27, 2021 to Notice of Preliminary Rejection mailed Nov. 27, 2020", w/ English Translation of Claims, 18 pgs.
"Korean Application Serial No. 10-2019-7014554, Response filed Jun. 25, 2021 to Final Office Action mailed May 25, 2021", w/ English Translation of Claims, 18 pgs.
"Korean Application Serial No. 10-2019-7023098, Notice of Preliminary Rejection mailed Oct. 8, 2020", w/ English translation, 15 pgs.
"Korean Application Serial No. 10-2019-7023098, Response filed Jan. 8, 2021 to Notice of Preliminary Rejection mailed Oct. 8, 2020", w/ English Claims, 19 pgs.
"Korean Application Serial No. 10-2019-7024288, Final Office Action mailed Jan. 8, 2022", w/ English translation, 5 pgs.
"Korean Application Serial No. 10-2019-7024288, Notice of Preliminary Rejection mailed Jun. 1, 2021", With English translation, 14 pgs.

(56) References Cited

OTHER PUBLICATIONS

"Korean Application Serial No. 10-2019-7024288, Notice of Preliminary Rejection mailed Dec. 15, 2020", With English translation, 11 pgs.
"Korean Application Serial No. 10-2019-7024288, Response filed Feb. 15, 2021 to Notice of Preliminary Rejection mailed Dec. 15, 2020", With English claims, 22 pgs.
"Korean Application Serial No. 10-2019-7024288, Response filed Aug. 18, 2021 to Notice of Preliminary Rejection mailed Jun. 1, 2021", With English claims, 22 pgs.
"Korean Application Serial No. 10-2021-7014739, Final Office Action mailed Dec. 27, 2021", w/ English translation, 6 pgs.
"Korean Application Serial No. 10-2021-7014739, Notice of Preliminary Rejection mailed May 29, 2021", w/ English translation, 9 pgs.
"Korean Application Serial No. 10-2021-7014739, Response filed Aug. 10, 2021 to Notice of Preliminary Rejection mailed May 29, 2021", w/ English claims, 17 pgs.
"Korean Application Serial No. 10-2021-7015384, Notice of Preliminary Rejection mailed Jun. 11, 2021", w/ English translation, 13 pgs.
"Korean Application Serial No. 10-2021-7015384, Response filed Oct. 7, 2021 to Notice of Preliminary Rejection mailed Jun. 11, 2021", w/ English Claims, 17 pgs.
"Korean Application Serial No. 10-2021-7033821, Final Office Action mailed Jun. 21, 2022", W/English Translation, 6 pgs.
"Korean Application Serial No. 10-2021-7033821, Notice of Preliminary Rejection mailed Nov. 16, 2021", w/ English Translation, 7 pgs.
"Korean Application Serial No. 10-2021-7033821, Response Filed Feb. 16, 2022 to Notice of Preliminary Rejection mailed Nov. 16, 2021", w/English Claims, 22 pgs.
"Korean Application Serial No. 10-2021-7033821, Response filed Sep. 20, 2022 to Final Office Action mailed Jun. 21, 2022", w/ English Claims, 16 pgs.
"Korean Application Serial No. 10-2022-7005953, Notice of Preliminary Rejection mailed Apr. 4, 2022", w/ English Translation, 13 pgs.
"Korean Application Serial No. 10-2022-7005953, Response filed Aug. 3, 2022 to Office Action mailed Apr. 4, 2022", w/ English Claims, 20 pgs.
"Korean Application Serial No. 10-2022-7018662, Notice of Preliminary Rejection mailed Jun. 29, 2022", W/English Translation, 9 pgs.
"Korean Application Serial No. 10-2022-7018662, Response filed Aug. 29, 2022 to Notice of Preliminary Rejection mailed Jun. 29, 2022", 9 pgs.
Besancon, Lonni, "A Tangible Volume for Portable 3D Interaction", Youtube, [Online] Retrieved from the Internet: <URL: https://www.youtube.com/watch?v=LP7GG612j-g>, [Accessed May 28, 2021], (Sep. 28, 2016), 4 pgs.
Bikos, Marios, "Diploma Thesis(AR-Chess)—Gameplay (Virtual Object Manipulation)", Youtube, [Online] Retrieved from the Internet: <URL: https://www.youtube.com/watch?v=lpb3xHwgLfU>, [Accessed May 28, 2021], (Jul. 3, 2015), 2 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Merriliance, et al., "Analysis of Object Picking Algorithms Using Bounding Box in Non Immersive Virtual World", International Journal of Engineering and Innovative Technology, vol. 1, Issue 2, (Feb. 2012), 8 pgs.
Park, Jong-Seung, et al., "Virtual Object Placement in Video for Augmented Reality", Advances in Multimedia Information Processing—PCM 2005: 6th Pacific Rim Conference on Multimedia, Jeju Island, KR, Proceedings (vol. 3767). Springer, Berlin, DE, (2005), 13-24.
Wroblewski, Luke, et al., "Touch Gesture Reference Guide", [Online] Retrieved from the internet: <URL: http://web.archive.org/web/20100423034847/http://www.lukew.com/ff/entry.asp?1071>, (Apr. 15, 2010), 14 pgs.
You, Suya, et al., "Hybrid Inertial and Vision Tracking for Augmented Reality Registration", Proceedings IEEE Virtual Reality (Cat. No. 99CB36316), (1999), 8 pgs.
"U.S. Appl. No. 18/132,940, Final Office Action mailed Mar. 6, 2024", 13 pgs.
"U.S. Appl. No. 18/132,940, Non Final Office Action mailed Nov. 22, 2023", 37 pgs.
"U.S. Appl. No. 18/132,940, Notice of Allowance mailed Jun. 5, 2024", 9 pgs.
"U.S. Appl. No. 18/132,940, Response filed Feb. 20, 2024 to Non Final Office Action mailed Nov. 22, 2023", 11 pgs.
"U.S. Appl. No. 18/132,940, Response filed May 6, 2024 to Final Office Action mailed Mar. 6, 2024", 10 pgs.
"U.S. Appl. No. 18/326,681, Non Final Office Action mailed Jul. 26, 2024", 29 pgs.
"Chinese Application Serial No. 201780065649.3, Decision of Rejection mailed Sep. 28, 2023", W/English Translation, 13 pgs.
"Chinese Application Serial No. 201780065649.3, Request for Reexamination filed Jan. 12, 2024", w/o English claims, 5 pgs.
"Chinese Application Serial No. 202211271509.0, Decision of Rejection mailed May 10, 2024", W/English Translation, 6 pgs.
"Chinese Application Serial No. 202211271509.0, Office Action mailed Mar. 2, 2024", W/English Translation, 12 pgs.
"Chinese Application Serial No. 202211271509.0, Office Action mailed Aug. 5, 2023", With English machine translation, 8 pgs.
"Chinese Application Serial No. 202211271509.0, Response filed Apr. 29, 2024 to Office Action mailed Mar. 2, 2024", With English Machine Translation, 6 pgs.
"Chinese Application Serial No. 202211271509.0, Response filed Dec. 11, 2023 to Office Action mailed Aug. 5, 2023", w/ English claims, 33 pgs.
"European Application Serial No. 23153345.6, Response filed Nov. 14, 2023 to Extended European Search Report mailed May 8, 2023", 15 pgs.
"European Application Serial No. 23196880.1, Extended European Search Report mailed Nov. 24, 2023", 10 pgs.
"European Application Serial No. 23196880.1, Response filed Jun. 25, 2024 to Extended European Search Report mailed Nov. 24, 2023", 16 pgs.
"European Application Serial No. 23197765.3, Extended European Search Report mailed Nov. 21, 2023", 9 pgs.
"European Application Serial No. 23197765.3, Response filed Jun. 20, 2024 to Extended European Search Report mailed Nov. 21, 2023", 12 pgs.
"Korean Application Serial No. 10-2023-7002059, Office Action mailed Aug. 14, 2020", w/ English Translation, 5 pgs.
"Korean Application Serial No. 10-2023-7030701, Notice of Preliminary Rejection mailed Mar. 20, 2024", w/ English translation, 12 pgs.
"Korean Application Serial No. 10-2023-7040211, Notice of Preliminary Rejection mailed Jul. 3, 2024", w/ English translation, 14 pgs.
"Korean Application Serial No. 10-2024-7006946, Notice of Preliminary Rejection mailed Jul. 18, 2024", w/ English translation, 11 pgs.
"U.S. Appl. No. 18/132,940, Notice of Allowance mailed Oct. 1, 2024", 8 pgs.
"U.S. Appl. No. 18/326,681, Response filed Oct. 28, 2024 to Non Final Office Action mailed Jul. 26, 2024", 11 pgs.
"European Application Serial No. 23153345.6, Communication Pursuant to Article 94(3) EPC mailed Oct. 29, 2024", 5 pgs.
"Korean Application Serial No. 10-2024-7006946, Response filed Oct. 15, 2024 to Notice of Preliminary Rejection mailed Jul. 18, 2024", w/ English claims, 21 pgs.
"Korean Application Serial No. 10-2023-7040211, Response filed Oct. 4, 2024 to Notice of Preliminary Rejection mailed Jul. 3, 2024", w/ English claims, 26 pgs.
"Chinese Application Serial No. 202211271509.0, Request for Reexamination filed Aug. 7, 2024 to Decision of Rejection mailed May 10, 2024", w/ English claims, 12 pgs.
"Korean Application Serial No. 10-2023-7030701, Response filed May 20, 2024 to Notice of Preliminary Rejection mailed Mar. 20, 2024", w/ English claims, 20 pgs.

(56) References Cited

OTHER PUBLICATIONS

"Korean Application Serial No. 10-2023-7030701, Final Office Action mailed Nov. 4, 2024", w/ English translation, 6 pgs.

"U.S. Appl. No. 18/326,681, Examiner Interview Summary mailed Apr. 18, 2025", 3 pgs.

"U.S. Appl. No. 18/326,681, Response filed Apr. 25, 2025 to Final Office Action mailed Jan. 27, 2025", 12 pgs.

"European Application Serial No. 23196880.1, Communication Pursuant to Article 94(3) EPC mailed Apr. 22, 2025", 8 pgs.

"Korean Application Serial No. 10-2023-7030701, Response filed Feb. 5, 2025 to Final Office Action mailed Nov. 4, 2024", w/ English Claims, 22 pgs.

"U.S. Appl. No. 18/326,681, Final Office Action mailed Jan. 27, 2025", 28 pgs.

* cited by examiner

AUGMENTED REALITY OBJECT MANIPULATION

PRIORITY

This application is a continuation of and claims the benefit of priority from U.S. patent application Ser. No. 16/790,332, filed Feb. 13, 2020, which application is a continuation of and claims the benefit of priority from U.S. patent application Ser. No. 15/581,994, filed Apr. 28, 2017, which claims benefit of priority from U.S. Provisional Patent Application Ser. No. 62/449,451, filed Jan. 23, 2017; this application also claims benefit of priority from U.S. Provisional Patent Application Ser. No. 62/444,218, filed Jan. 9, 2017; this application also claims benefit of priority from U.S. Provisional Patent Application Ser. No. 62/412,103, filed Oct. 24, 2016, which are hereby incorporated by reference in their entirety.

BACKGROUND

Augmented reality (AR) refers to supplementing the view of real-world objects and environments with computer-generated graphics content. Embodiments of the present disclosure address, among other things, the manipulation of virtual 3D objects in an AR environment using different physical elements, such as a user's hands.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of computer imaging software and systems by facilitating the manipulation of virtual content displayed in conjunction with images of real-world objects and environments. Embodiments of the present disclosure allow different virtual objects to be moved onto different physical surfaces, as well as manipulated in other ways.

Figure 1:
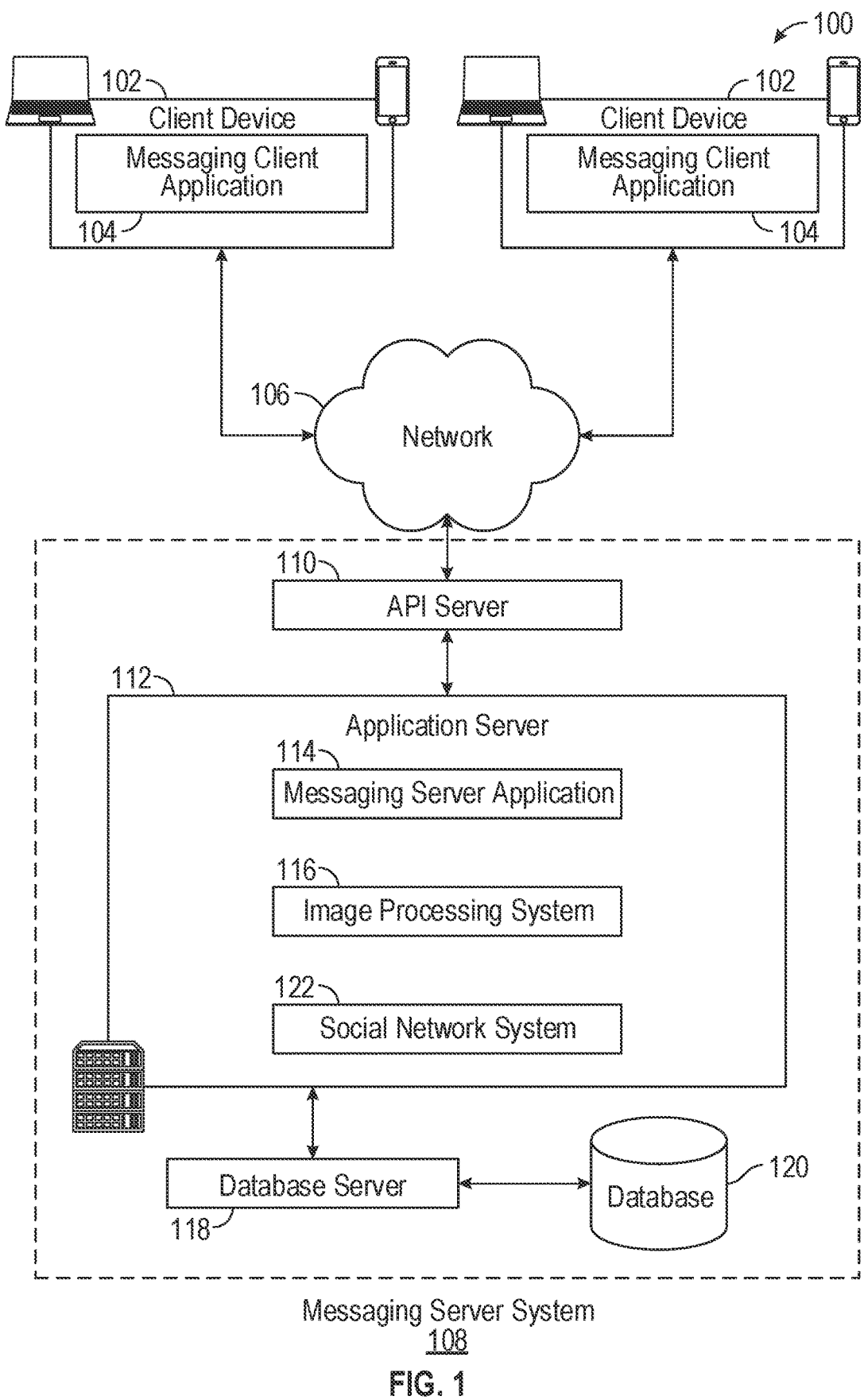
FIG. 1 is a block diagram showing an exemplary messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
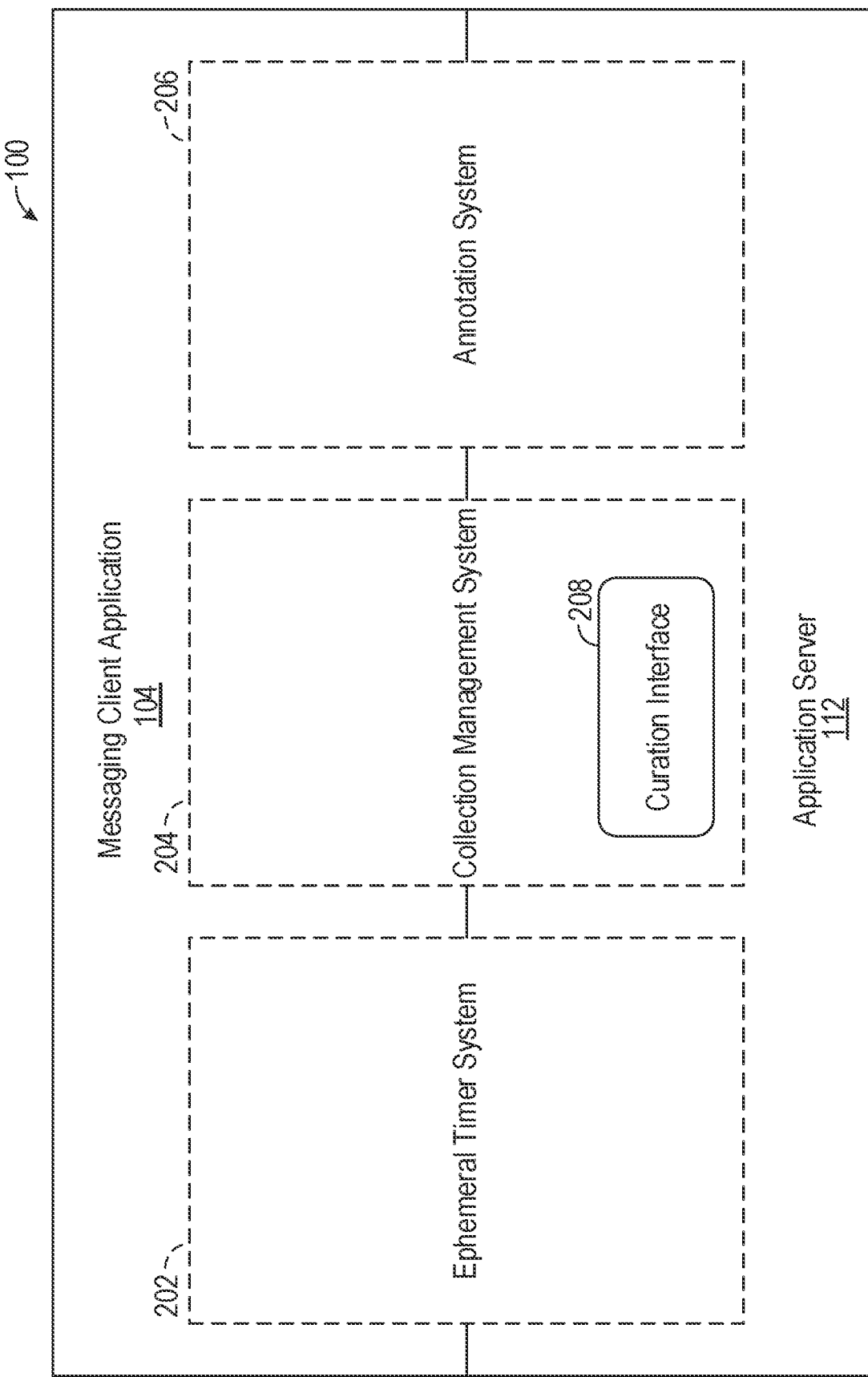
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT® story), selectively display and enable access to messages and associated content via the messaging client application 104.

The collection management system 204 is responsible for managing collections of media (e.g., collections of text, image, video and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT® filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 102. For example, the media overlay including text that can be overlaid on top of a photograph/electronic image generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some exemplary embodiments, as discussed in more detail below, embodiments of the present disclosure may generate, display, distribute, and apply media overlays to media content items. For example, embodiments may utilize media content items generated by a client device 102 (e.g., an image or video captured using a digital camera coupled to the client device 102) to generate media overlays that can be applied to other media content items.

Figure 3:
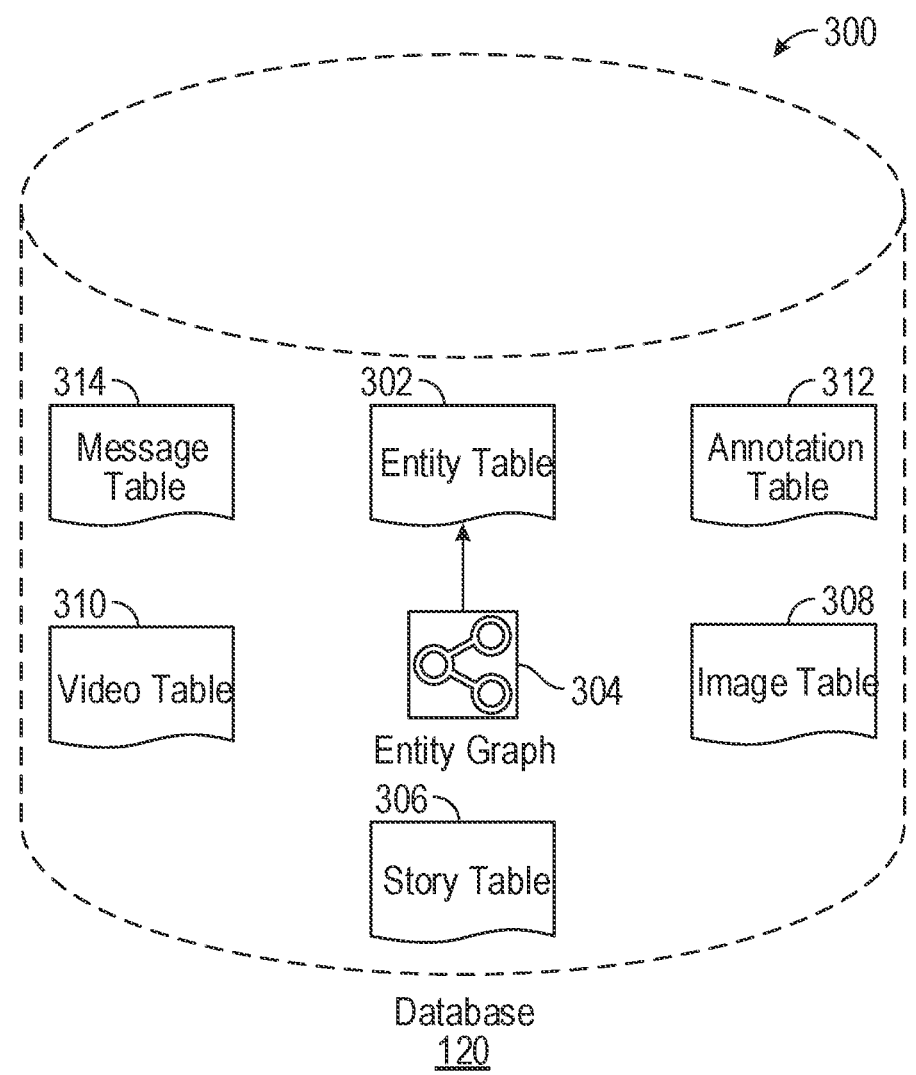
FIG. 3 is a schematic diagram illustrating data which may be stored in the database of the messaging server system, according to various exemplary embodiments.

FIG. 3 is a schematic diagram 300 illustrating data 300 that is stored in the database 120 of the messaging server system 108, according to certain exemplary embodiments. While the content of the database 120 is shown to comprise a number of tables, the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message.

Other types of filters include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time. Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT® story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein.

Figure 4:
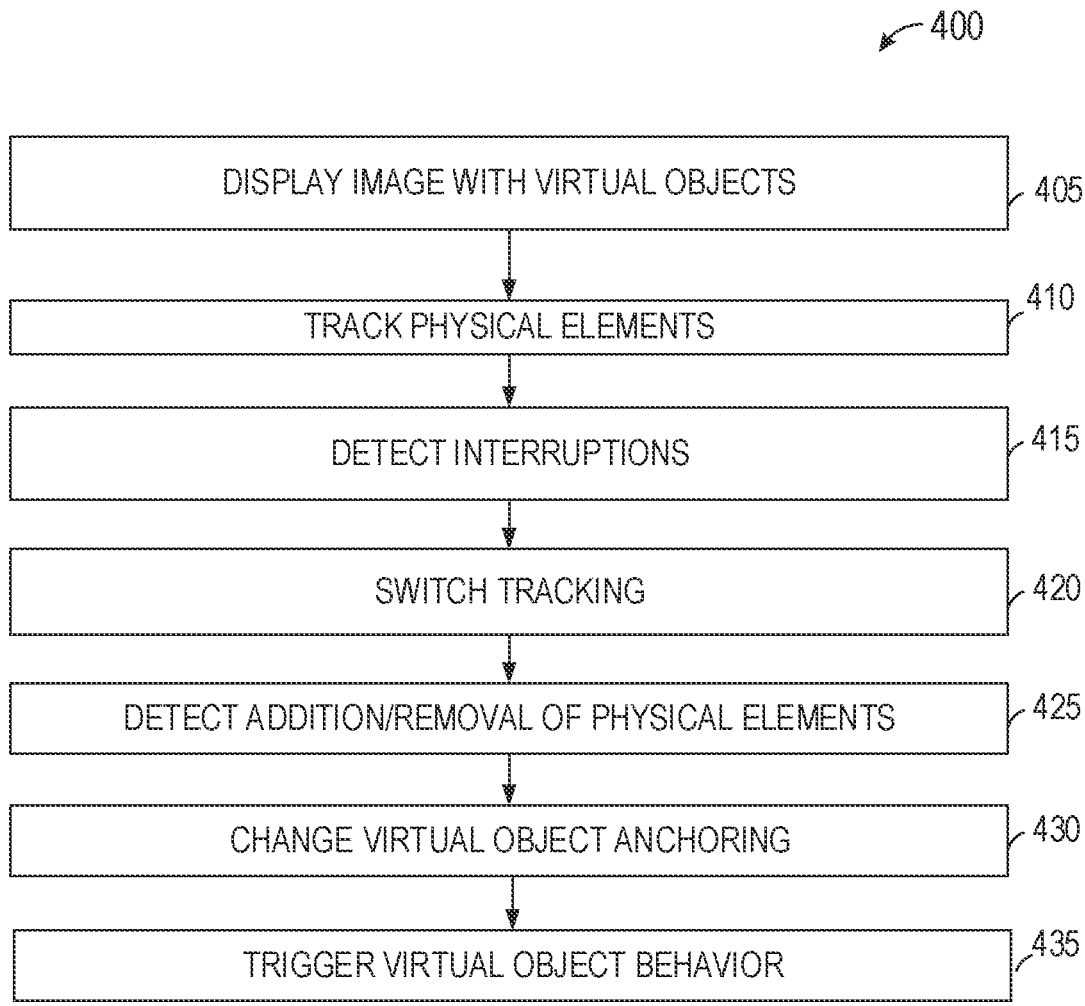
FIG. 4 is a flow diagram of an exemplary process according to various aspects of the disclosure.

FIG. 4 depicts an exemplary process according to various aspects of the present disclosure. In this example, method 400 includes displaying an image on a display screen of a computing device (405), tracking one or more physical elements within the image (410), detecting interruptions by one or more physical elements (415), switching from tracking one physical element to another (420), detecting the addition/removal of physical elements within the image (425), changing the anchoring of virtual objects in the image (430), and triggering virtual object behavior (435). The steps of method 400 may be performed in whole or in part, may be performed in conjunction each other as well as with some or all of the steps in other methods, and may be performed by any number of different systems, such as the systems described in FIGS. 1 and 7.

In method 400, the system displays an image on the display screen of a computing device. In some embodiments, the image may be a still image (e.g., previously captured by the camera of the computing device). In other embodiments, the image may be part of a live video or stream captured through the camera and displayed on the display screen. The system may display (410) any number of different virtual objects within the image, including text, animations, avatars of users, and other objects. In the exemplary screenshots shown in FIGS. 5A-5C, for instance, the image includes a virtual object comprising a 3D model of a heart-shaped head superimposed over the real-world scene captured by the camera in the background.

Figure 5A:
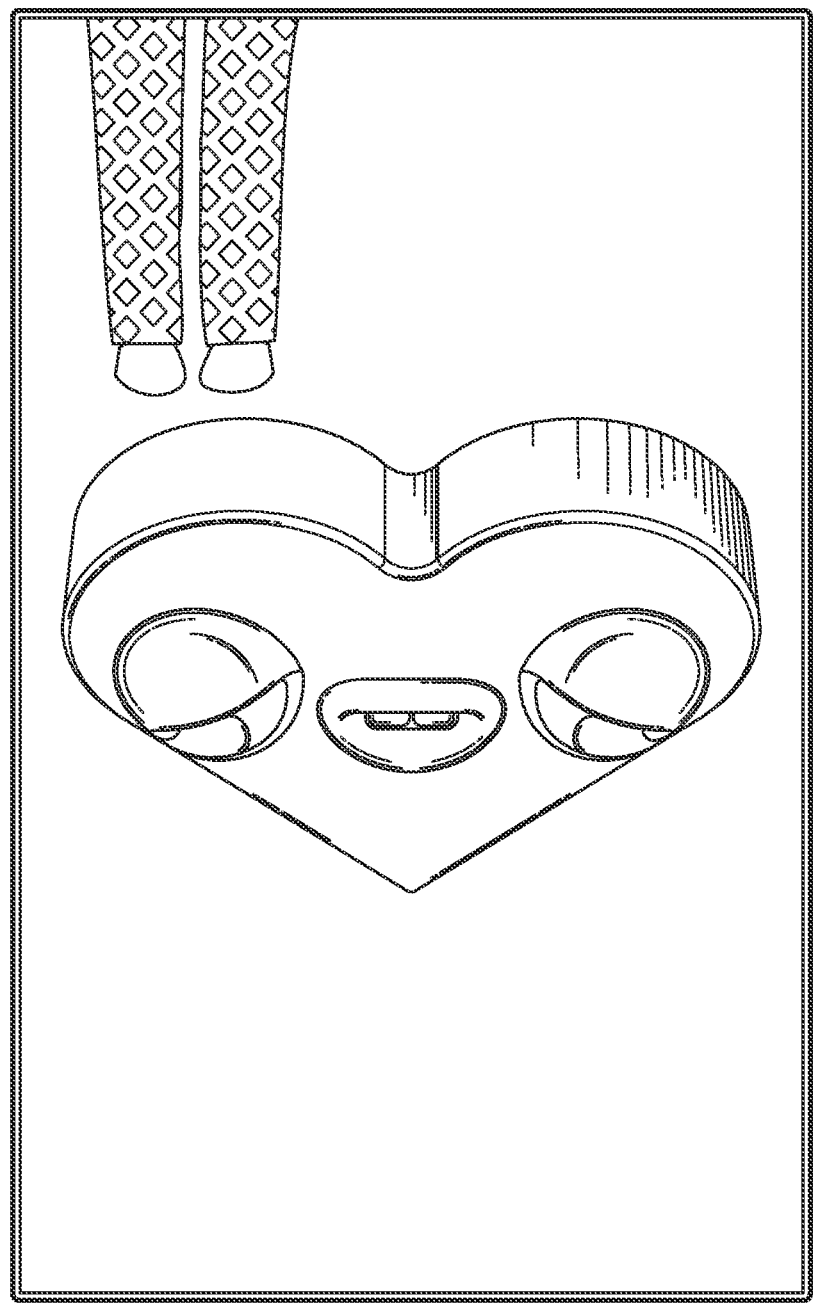
FIGS. 5A-5F are screenshots illustrating the aspects of the method described in FIG. 4.
Figure 5B:

Embodiments of the present disclosure allow a user to place virtual objects (such as the 3D model shown in FIGS. 5A-5C) in any selected position within the image, as well as to interact with the objects. For example, as shown in FIG. 5B, a user can pick an object off the ground and carry it in the user's hand.

Embodiments of the present disclosure can identify and track different physical elements within an image, such as parts of a human user (e.g., the user's hands, legs, etc.) surfaces (e.g., the floor, a table, etc.), and other objects and beings (e.g., vehicles, animals, etc.). Such physical elements can be used to manipulate virtual objects (e.g., from one physical element to another). Virtual content can be manipulated in a variety of different ways, including adding new virtual objects to an image, removing virtual objects from an image, repositioning virtual content, and modifying the virtual content (e.g., changing its size, scale, direction/orientation, color, shape, etc.).

Figure 5C:
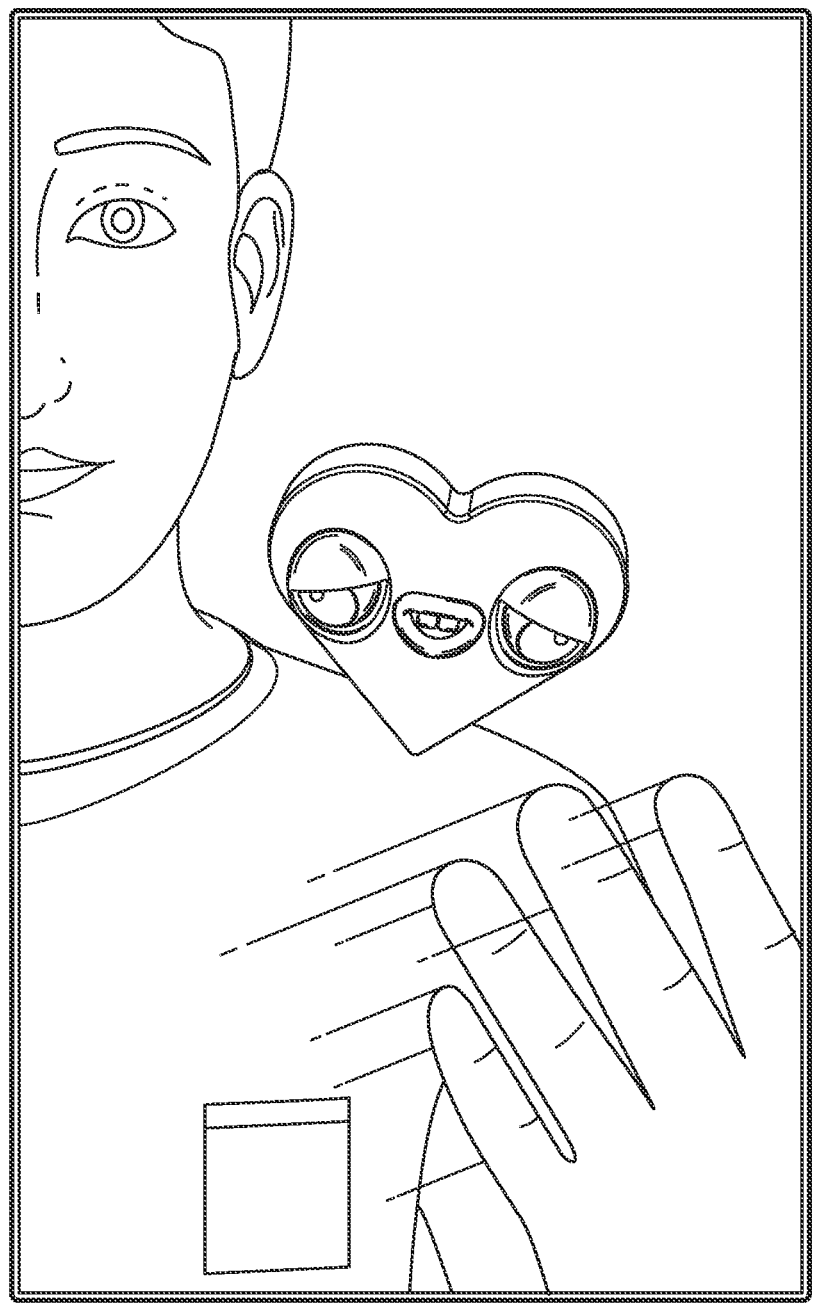

The virtual object may be anchored to a physical element. In FIGS. 5A-5C, for example, the system tracks a primary physical element, namely the surface of the ground upon which the virtual object (the heart) is sitting/anchored. The system may detect one physical element interrupting (415) or interacting with another physical element. In FIG. 5B, for example, the system detects a secondary physical element (the user's hand) interrupting the primary physical element when the user moves his hand to pick up the heart. In response to detecting the secondary physical element (the user's hand) surpassing a predetermined tolerance limit, the system switches tracking (420) from the primary physical element (the ground) to the secondary physical element (the user's hand), anchors the virtual object (the heart) to the user's hand, and the heart is then depicted in the image on the display screen of the computing device as being carried in the user's hand.

The system may detect the addition or removal of physical elements from the image (425) and perform various actions in response. For example, in FIG. 5C, the system detects that the user carries the heart to a person's shoulder and then removes the user's hand from the image. In response to detecting the removal of the secondary physical element, the system may resume tracking the primary physical element (e.g., if the user were to move the heart from one position on the ground to another) or begin tracking a tertiary physical element (e.g., the person's shoulder in the example shown in FIG. 5C). The system may anchor the virtual object to the closest physical entity to the virtual object when a physical entity it is currently anchored to is removed. In FIG. 5C, for example, the user moves his hand to the user's shoulder and then removes his hand from the image. In response, the system anchors the heart to the person's shoulder and the object may subsequently be depicted as sitting on the person's shoulder as the person moves around within the image.

In operation, the system may analyze the image (e.g., being captured by the camera in real-time or near-real-time) and map various interest points within the image. In FIG. 5A, the system may introduce (automatically or in response to user input via the computing device) the virtual object (heart) to the image and initially anchors the image to a primary physical element (in this case the ground). The heart may remain in its location until a secondary physical element is detected and is determined to interfere with the primary physical element to at least a predetermined degree.

The system may trigger behavior associated with a virtual object (435) in response to various events, including changes in the image, date, time, geolocation information, the context of events occurring within the image, and others. For example, the system may detect an event such as a collision or contact between a virtual object in an image and a physical element, and invoke behavior for the virtual object in response. In one example, the heart (having a face on its front) in FIGS. 5A-5C may be depicted as having various expressions depending on whether the heart is unattached to a human physical element (e.g., sitting on the ground as shown in FIG. 5A) or attached to a human physical element (e.g., as shown in FIG. 5C). In the former case, the face on the heart may appear to be frowning or sad, but turn to smiling or happy once placed on the person's shoulder in FIG. 5C.

Figure 5D:
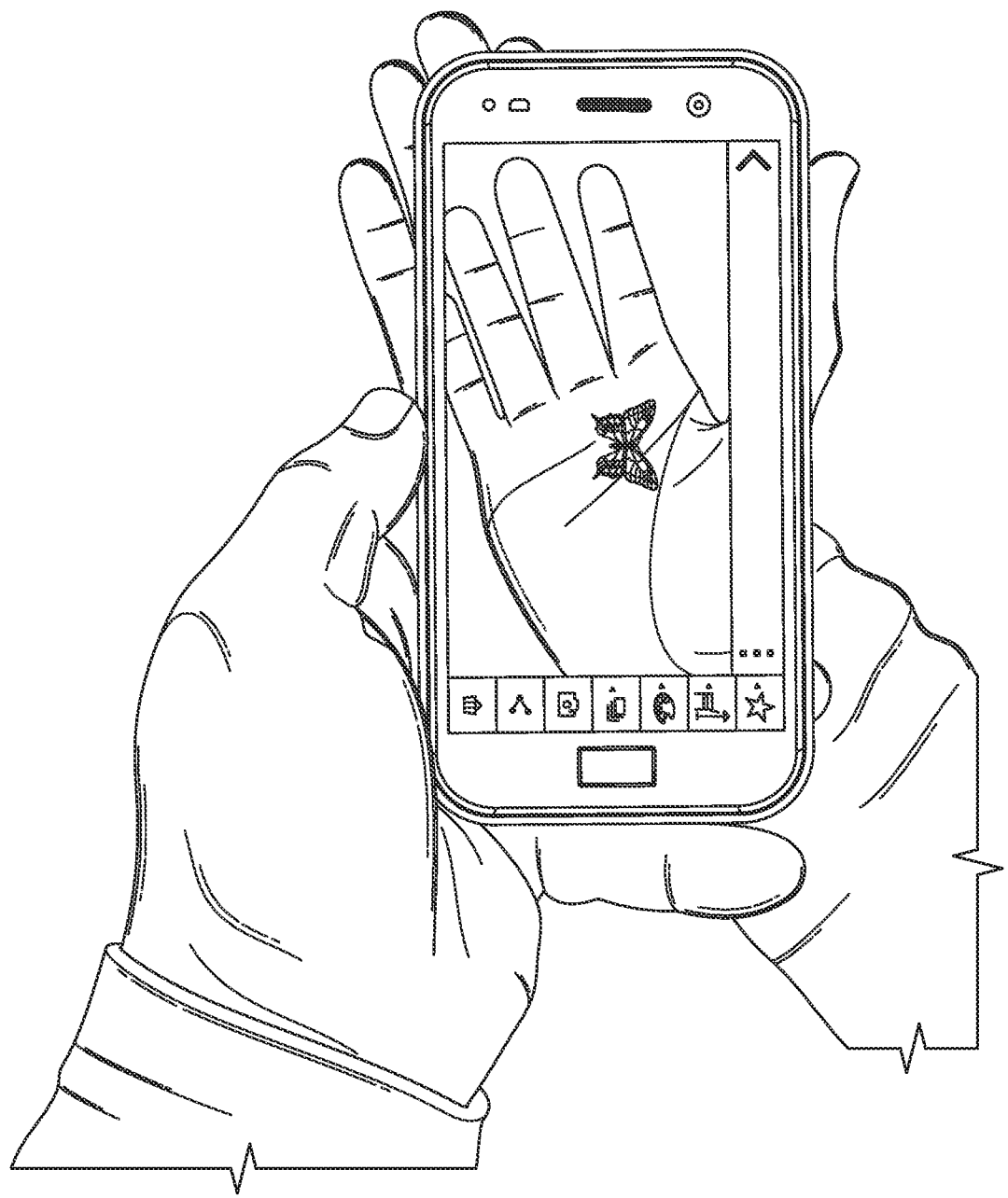
Figure 5E:
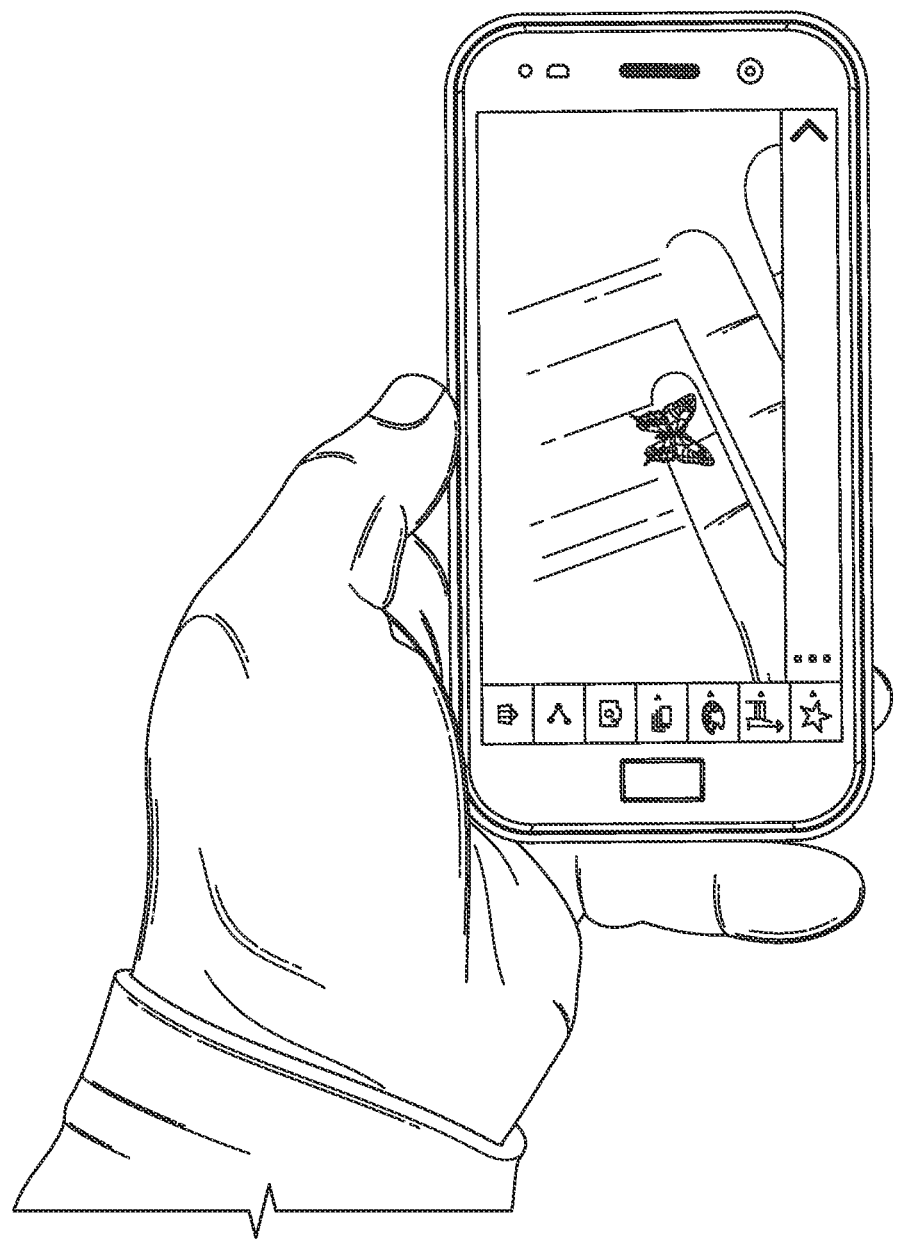
Figure 5F:
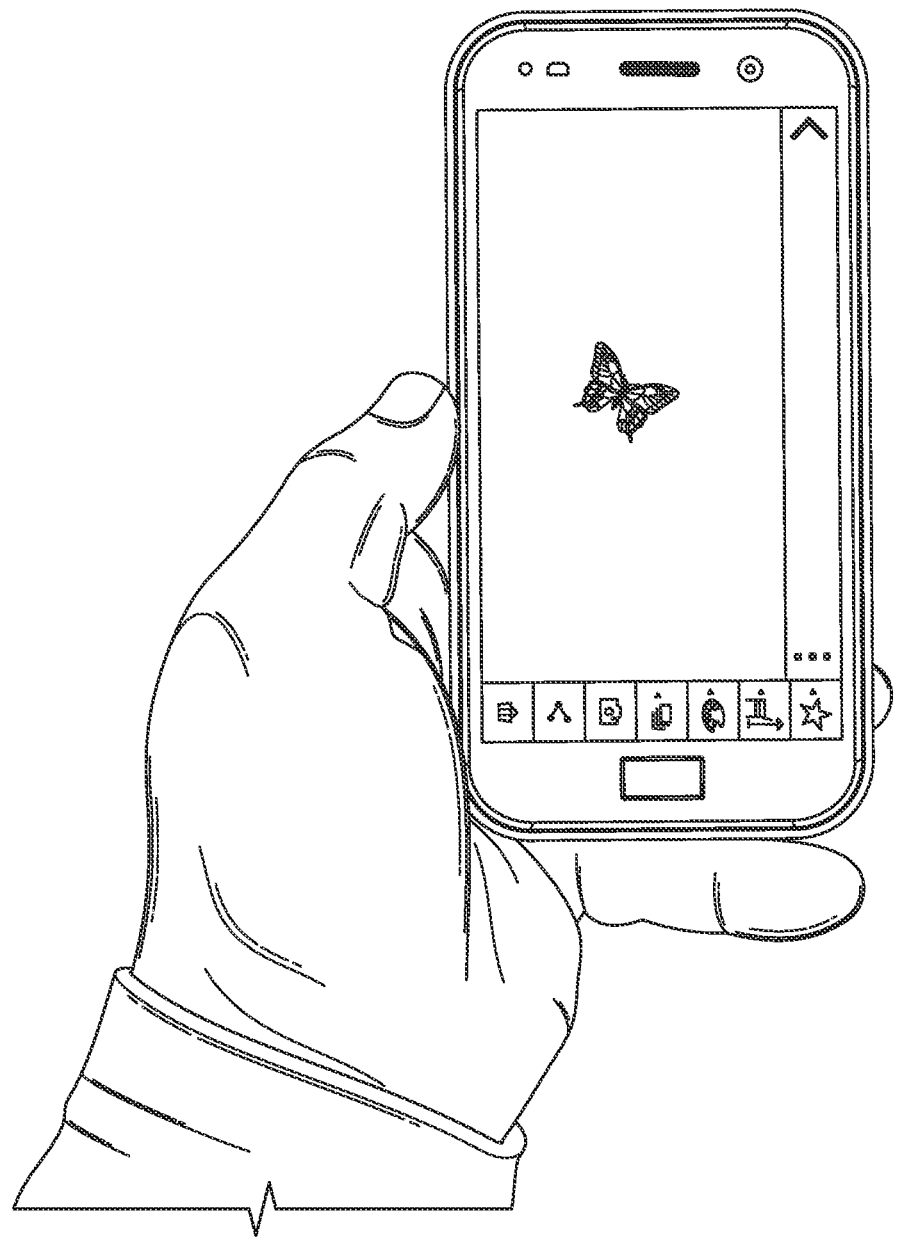

A variety of behaviors may be triggered for a virtual object, such as changes in the object's appearance (e.g., as described above), physical collisions with tracked surfaces, content state changes, object occlusion, and others. In another example, referring now to FIGS. 5D-5F, the system tracks the virtual object (a butterfly) anchored to the user's hand (FIG. 5D), detects the removal of the user's hand (FIG. 5E), and in response to the event of the surface to which the virtual object (butterfly) is anchored being removed from the image, the system triggers a behavior of the butterfly, namely animating the butterfly to appear to fly about the image.

The system may generate virtual objects that represent avatars of the user of the computing device, as well as avatars of other individuals in the image. In one exemplary embodiment, the system generates an avatar of the user holding the computing device displaying the image (e.g., based on avatar information for the user stored in the device) and projects a virtual object within the image that includes a three-dimensional avatar of the user. In other embodiments, the system may employ image recognition techniques to identify individuals within the image and generate a virtual object that include an avatar of such an individual.

The display of virtual objects may be performed for a limited, predetermined time period or based on event criteria. For example, in the case of the examples shown in FIGS. 5A-5F, the heart may be made available only for a single day (e.g., Valentine's day). In another example, the butterfly may be made available within the image only so long as the user interacts with the butterfly in some manner within an hour, otherwise the butterfly may be depicted as flying away (e.g., leaving the image).

The system may display images containing virtual objects as part of, or in conjunction with, a variety of media content items. In this context, a "media content item" may include any type of electronic media in any format. For example, a media content item may include an image in JPG format, an image in PNG format, a video in FLV format, a video in AVI format, etc. In some exemplary embodiments, a media content item may include content that is captured using an image capture device or component (such as a digital camera) coupled to, or in communication with, a system performing the functionality of method 400. In the exemplary system 700 depicted in FIG. 7 may include a digital camera as one of input components 728. Additionally or alternatively, the media content item may be received from another system or device. In FIG. 1, for example, a client device 102 performing the functionality of method 400 may receive a media content item from another client device 102 or other system via network 106.

In some embodiments, the media content item generated or used by the system may be included in a media overlay such as a "sticker" (i.e., an image that can be overlaid onto other images), filter (discussed above), or another media overlay. Such overlays may include static (i.e., non-moving) features as well as dynamic (i.e., moving) features. Generation of media content items by embodiments of the present disclosure may include the generation of one or more data structure fields containing information regarding the content item. For example, the system may generate a name field in a data structure for the media overlay that includes a name for the media content item received from the content provider.

Embodiments of the present disclosure may transmit and receive electronic communications containing media content items, media overlays, or other content any form of electronic communication, such as SMS texts, MMS texts, emails, and other communications. Media content items included in such communications may be provided as attachments, displayed inline in the message, within media overlays, or conveyed in any other suitable manner.

Software Architecture

Figure 6:
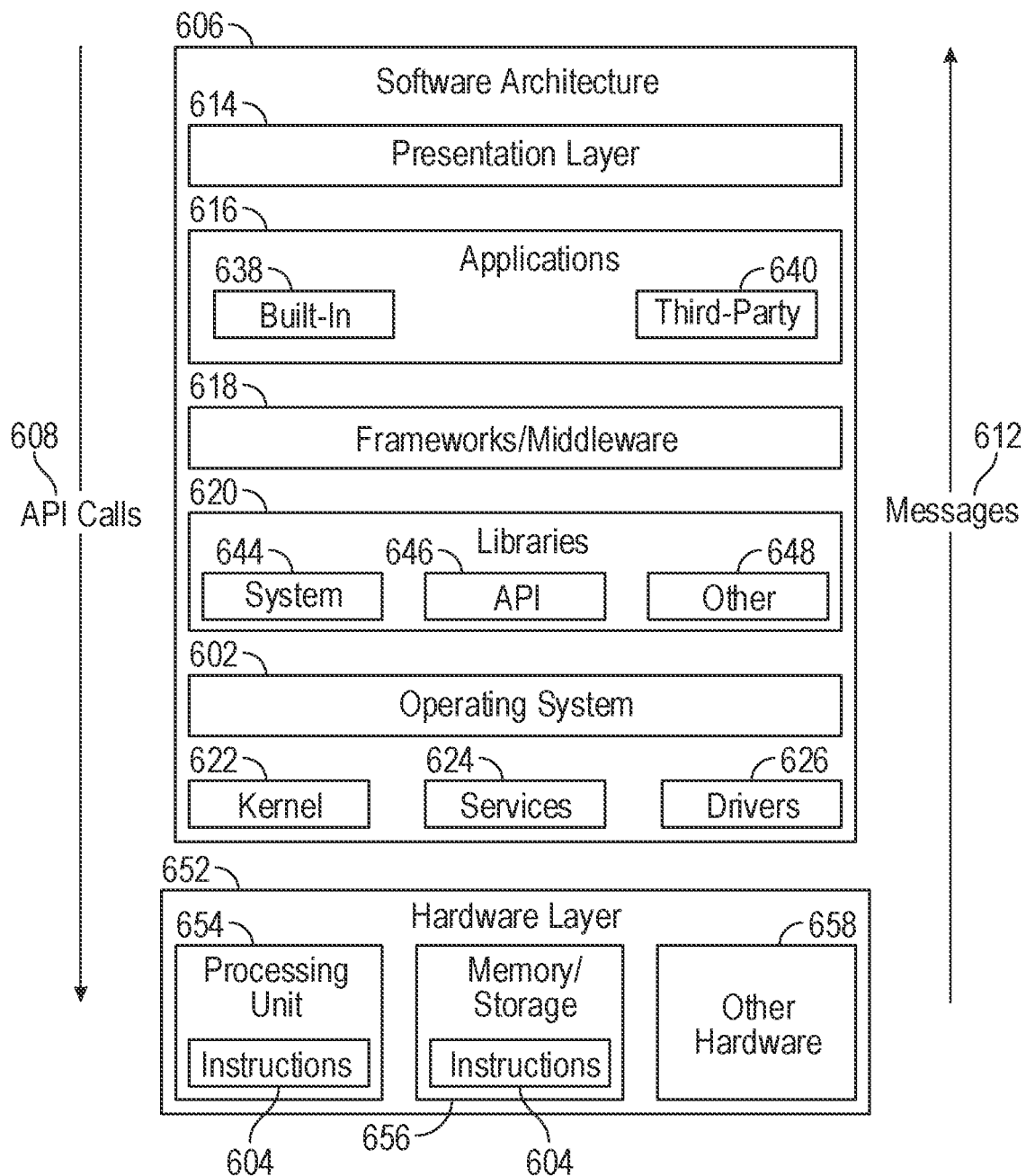
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
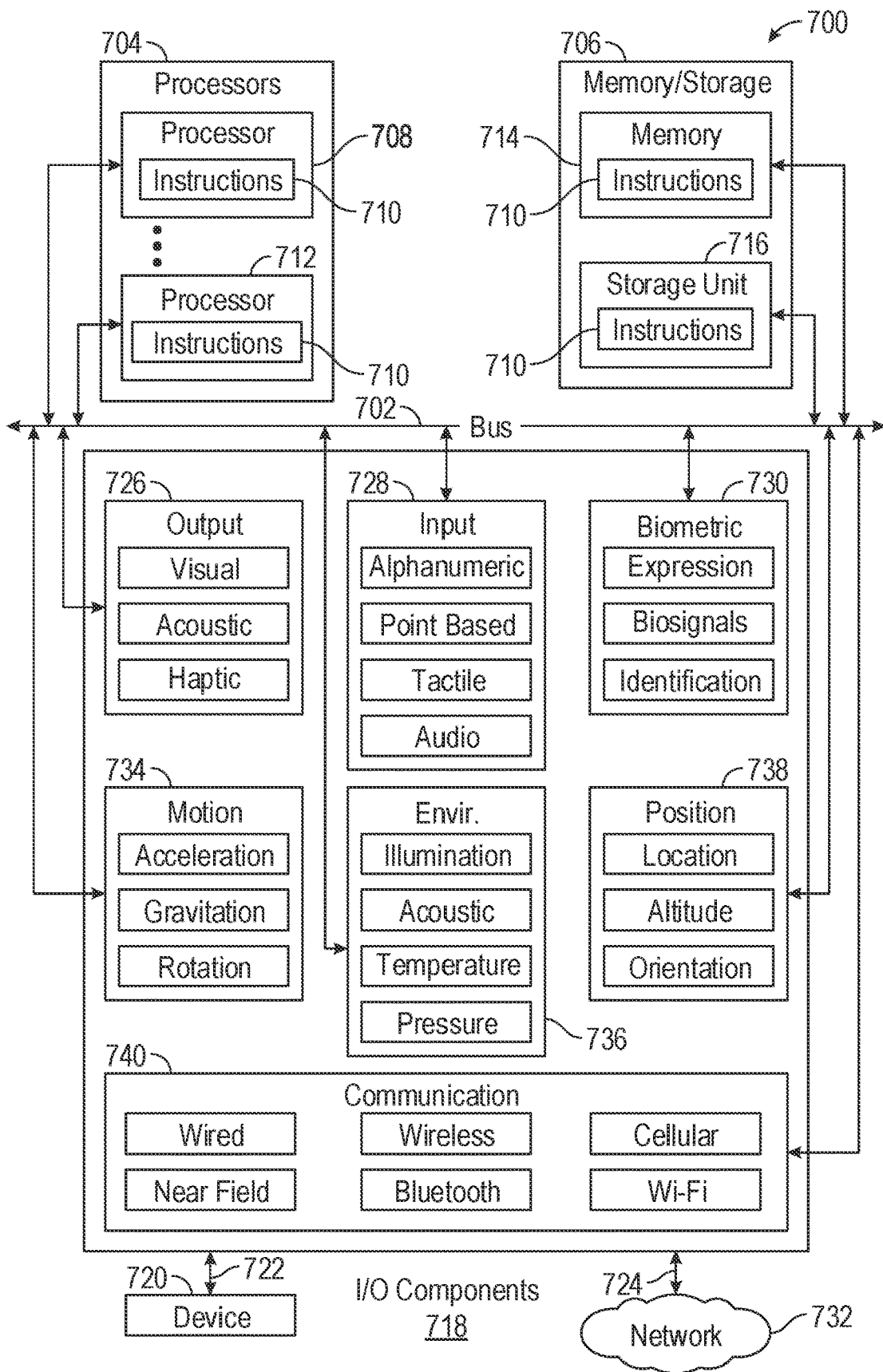
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAP, INC. 2016, All Rights Reserved.

What is claimed is:

1. A system comprising:
    a processor;
    a user interface coupled to the processor, the user interface comprising an input device, a camera, and a display screen; and
    memory coupled to the processor and storing instructions that, when executed by the processor, cause the system to perform operations comprising:
    causing an image comprising a real-world scene captured via the camera to be displayed on the display screen;
    causing a virtual object to be displayed on the display screen as being anchored to a primary physical element within the image, wherein the virtual object being anchored to the primary physical element comprises the virtual object being depicted as sitting on the primary physical element as the primary physical element moves around within the image;
    tracking the primary physical element within the image;
    detecting removal of the primary physical element, wherein detecting removal of the primary physical element includes detecting that the primary physical element is not within the image;
    detecting an interaction by a secondary physical element with the virtual object; and
    in response to detecting removal of the primary physical element and detecting interaction by the secondary physical element with the virtual object,
        causing the virtual object to be animated and to be displayed on the display screen as being anchored to the secondary physical element within the image and as no longer being anchored to the primary physical element within the image, wherein the virtual object being anchored to the secondary physical element comprises the virtual object being depicted as sitting on the secondary physical element as the secondary physical element moves around within the image.

2. The system of claim 1, wherein causing the virtual object to be animated further comprises:
    triggering a behavior associated with the virtual object.

3. The system of claim 1, wherein causing the virtual object to be animated further comprises:
    altering an appearance of the virtual object.

4. The system of claim 1, wherein the memory further stores instructions for causing the system to perform operations comprising:
    in response to detecting the interaction by the secondary physical element with the virtual object,
    determining whether the secondary physical element surpasses a predetermined tolerance limit; and
    tracking the secondary physical element in response to determining that the secondary physical element surpasses the predetermined tolerance limit.

5. The system of claim 4, wherein the secondary physical element is a physical entity in the image that was previously tracked.

6. The system of claim 4, wherein the secondary physical element is a closest physical entity in the image to the virtual object.

7. The system of claim 6, wherein the closest physical entity is one or more of:
    a human, an animal, a surface, and an object.

8. The system of claim 1, wherein tracking the primary physical element includes tracking the primary physical element as the system is moved, and wherein movement of the system includes one or more of: a movement from a first position to a second position, and a rotation.

9. A computer-implemented method comprising:
    causing, by a processor, an image comprising a real-world scene captured via a camera to be displayed on a display screen;
    causing a virtual object to be displayed on the display screen as being anchored to a primary physical element within the image, wherein the virtual object being anchored to the primary physical element comprises the virtual object being depicted as sitting on the primary physical element as the primary physical element moves around within the image;
    tracking the primary physical element within the image;
    detecting removal of the primary physical element, wherein detecting removal of the primary physical element includes detecting that the primary physical element is not within the image;
    detecting an interaction by a secondary physical element with the virtual object; and
    in response to detecting removal of the primary physical element and detecting interaction by the secondary physical element with the virtual object,
    causing the virtual object to be animated and to be displayed on the display screen as being anchored to the secondary physical element within the image and as no longer being anchored to the primary physical element within the image, wherein the virtual object being anchored to the secondary physical element comprises the virtual object being depicted as sitting on the secondary physical element as the secondary physical element moves around within the image.

10. The computer-implemented method of claim 9, wherein causing the virtual object to be animated further comprises:
    triggering a behavior associated with the virtual object.

11. The computer-implemented method of claim 9, wherein causing the virtual object to be animated further comprises:
    altering an appearance of the virtual object.

12. The computer-implemented method of claim 9, further comprising:
    in response to detecting the interaction by the secondary physical element with the virtual object, determining whether the secondary physical element surpasses a predetermined tolerance limit; and
    tracking the secondary physical element in response to determining that the secondary physical element surpasses the predetermined tolerance limit.

13. The computer-implemented method of claim 12, wherein the secondary physical element is a physical entity in the image that was previously tracked.

14. The computer-implemented method of claim 12, wherein the secondary physical element is a closest physical entity in the image to the virtual object.

15. The computer-implemented method of claim 14, wherein the closest physical entity is one or more of:
a human, an animal, a surface, and an object.

16. The computer-implemented method of claim 9, wherein tracking the primary physical element includes tracking the primary physical element as a system is moved, and wherein movement of the system includes one or more of: a movement from a first position to a second position, and a rotation.

17. A non-transitory computer-readable medium storing instructions that, when executed by a processor, cause the processor to perform operations comprising:
 causing an image comprising a real-world scene captured via a camera to be displayed on a display screen;
 causing a virtual object to be displayed on the display screen as being anchored to a primary physical element within the image, wherein the virtual object being anchored to the primary physical element comprises the virtual object being depicted as sitting on the primary physical element as the primary physical element moves around within the image;
 tracking the primary physical element within the image;
 detecting removal of the primary physical element, wherein detecting removal of the primary physical element includes detecting that the primary physical element is not within the image;
 detecting an interaction by a secondary physical element with the virtual object; and
 in response to detecting removal of the primary physical element and detecting interaction by the secondary physical element with the virtual object,
 causing the virtual object to be animated and to be displayed on the display screen as being anchored to the secondary physical element within the image and as no longer being anchored to the primary physical element within the image, wherein the virtual object being anchored to the secondary physical element comprises the virtual object being depicted as sitting on the secondary physical element as the secondary physical element moves around within the image.

18. The non-transitory computer-readable medium of claim 17, wherein causing the virtual object to be animated further comprises:
 triggering a behavior associated with the virtual object or changing an appearance of the virtual object.

\* \* \* \* \*

UNITED STATES PATENT AND TRADEMARK OFFICE
CERTIFICATE OF CORRECTION

PATENT NO. : 12,361,652 B2  
APPLICATION NO. : 18/150041  
DATED : July 15, 2025  
INVENTOR(S) : Egri et al.

Page 1 of 1

It is certified that error appears in the above-identified patent and that said Letters Patent is hereby corrected as shown below:

On the Title Page

On page 5, in Column 2, item (56) under "Other Publications", Line 69, delete "malled" and insert --mailed-- therefor On page 6, in Column 1, item (56) under "Other Publications", Line 24, delete "malled" and insert --mailed-- therefor On page 7, in Column 2, item (56) under "Other Publications", Line 28, delete "malled" and insert --mailed-- therefor On page 7, in Column 2, item (56) under "Other Publications", Line 42, delete "malled" and insert --mailed-- therefor On page 8, in Column 1, item (56) under "Other Publications", Line 1, delete "malled" and insert --mailed-- therefor On page 8, in Column 1, item (56) under "Other Publications", Line 58, delete "toOffice" and insert --to Office-- therefor In the Claims In Column 18, Line 56, in Claim 12, after "object,", insert a linebreak Signed and Sealed this  
Tenth Day of February, 2026

John A. Squires  
*Director of the United States Patent and Trademark Office*